US010649859B2

(12) United States Patent
Lin

(10) Patent No.: US 10,649,859 B2
(45) Date of Patent: May 12, 2020

(54) PERFORMING A RECOVERY PROCESS FOR A NETWORK NODE IN A DISTRIBUTED SYSTEM

(71) Applicant: Alibaba Group Holding Limited, George Town (KY)

(72) Inventor: Peng Lin, Hangzhou (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/421,922

(22) Filed: May 24, 2019

(65) Prior Publication Data

US 2019/0286531 A1    Sep. 19, 2019

Related U.S. Application Data

(63) Continuation of application No. PCT/CN2018/120870, filed on Dec. 13, 2018.

(51) Int. Cl.
*G06F 11/14* (2006.01)
*G06F 16/182* (2019.01)
(Continued)

(52) U.S. Cl.
CPC ...... *G06F 11/1464* (2013.01); *G06F 11/1469* (2013.01); *G06F 16/1824* (2019.01);
(Continued)

(58) Field of Classification Search
CPC ............ G06F 11/1464; G06F 16/2379; G06F 11/2089; G06F 9/455; H04L 63/06;
(Continued)

(56) References Cited

U.S. PATENT DOCUMENTS 4,309,569 A    1/1982    Merkle
4,569,015 A    2/1986    Dolev et al.
(Continued)

FOREIGN PATENT DOCUMENTS

CN    106529951    3/2017
CN    107360206    11/2017
(Continued)

OTHER PUBLICATIONS

Castro et al., "Practical Byzantine Fault Tolerance and Proactive Recovery," ACM Transactions on Computer Systems, 2002, 20(4):398-461.
(Continued)

*Primary Examiner* — Etienne P Leroux
(74) *Attorney, Agent, or Firm* — Fish & Richardson P.C.

(57) ABSTRACT

A method for performing a recovery process of a network node of a blockchain network includes broadcasting a state request message by the network node to the other network nodes of the blockchain network to recover a target transaction of a target sequence number, receiving state reply messages that each includes a sequence number from the other network nodes, identifying the target sequence number based on the sequence numbers in the state reply messages, sending a requesting message to the other network nodes to request an ECHO message from each of the other network nodes, determining a number of valid ECHO messages that are sent by the other network nodes, recovering the target transaction based on the number of valid ECHO messages, and sending a message to the other network nodes indicating that the network node has been recovered.

27 Claims, 17 Drawing Sheets

(51) Int. Cl.
*G06F 16/22* (2019.01)
*H03M 13/15* (2006.01)
*H04L 9/06* (2006.01)
*H04L 12/26* (2006.01)
*H04L 29/06* (2006.01)
*H04L 9/32* (2006.01)

(52) U.S. Cl.
CPC ...... *G06F 16/1834* (2019.01); *G06F 16/2246* (2019.01); *H03M 13/154* (2013.01); *H04L 9/0643* (2013.01); *H04L 9/3239* (2013.01); *H04L 43/50* (2013.01); *H04L 63/12* (2013.01); *H04L 2209/38* (2013.01)

(58) Field of Classification Search
CPC ............... H04L 12/1877; H04L 9/3252; H04L 67/1059; G06Q 10/107
See application file for complete search history.

(56) References Cited

U.S. PATENT DOCUMENTS

| | | | |
|---|---|---|---|
| 6,671,821 B1 | 12/2003 | Castro et al. | |
| 2002/0129087 A1* | 9/2002 | Cachin | H04L 12/1877 709/200 |
| 2004/0133634 A1* | 7/2004 | Luke | G06F 11/2089 709/203 |
| 2006/0198346 A1 | 9/2006 | Liu et al. | |
| 2009/0013046 A1* | 1/2009 | Lee | G06Q 10/107 709/206 |
| 2012/0180051 A1* | 7/2012 | Ikegaya | G06F 9/455 718/1 |
| 2012/0233469 A1* | 9/2012 | Vanstone | H04L 9/3252 713/176 |
| 2013/0290655 A1* | 10/2013 | Fang | G06F 16/2379 711/156 |
| 2016/0004609 A1 | 1/2016 | Knight | |
| 2017/0046234 A1* | 2/2017 | Yang | G06F 11/1464 |
| 2017/0228371 A1 | 8/2017 | Seger, II | |
| 2017/0344987 A1* | 11/2017 | Davis | H04L 63/06 |
| 2018/0101560 A1 | 4/2018 | Christidis et al. | |
| 2018/0123882 A1 | 5/2018 | Anderson et al. | |
| 2018/0139278 A1 | 5/2018 | Bathen et al. | |
| 2018/0181751 A1 | 6/2018 | Jagadeesan et al. | |
| 2018/0307573 A1 | 10/2018 | Abraham et al. | |
| 2018/0329783 A1 | 11/2018 | Karame et al. | |
| 2019/0087598 A1 | 3/2019 | Adkins et al. | |
| 2019/0124146 A1* | 4/2019 | Austin | H04L 67/1059 |
| 2019/0278666 A1 | 9/2019 | Lin | |
| 2019/0280879 A1 | 9/2019 | Lin | |
| 2019/0288993 A1 | 9/2019 | Lin | |

FOREIGN PATENT DOCUMENTS

| | | |
|---|---|---|
| CN | 107423152 | 12/2017 |
| CN | 107528882 | 12/2017 |
| CN | 108306760 | 7/2018 |
| CN | 108365993 | 8/2018 |
| CN | 108616596 | 10/2018 |
| CN | 108768749 | 11/2018 |
| RU | 2595540 | 4/2017 |
| RU | 2639015 | 12/2017 |
| WO | WO 2017036546 | 3/2017 |
| WO | WO 2018217804 | 11/2018 |

OTHER PUBLICATIONS

Castro et al., "Practical Byzantine Fault Tolerance," Proceedings of the Third Symposium on Operating Systems Design and Implementation, 1999, 14 pages.

Crosby et al., "BlockChain Technology: Beyond Bitcoin," Sutardja Center for Entrepreneurship & Technology Technical Report, Oct. 16, 2015, 35 pages.

Nakamoto, "Bitcoin: A Peer-to-Peer Electronic Cash System," www.bitcoin.org, 2005, 9 pages.

Alzahrani et al., "Block-Supply Chain: A New Anti-Counterfeiting Supply Chain Using NFC and Blockchain," CryBlock'18 Proceedings of the 1st Workshop on Cryptocurrencies and Blockchains for Distributed Systems, Jun. 2018, pp. 30-35.

PCT International Search Report and Written Opinion in International Application No. PCT/CN2018/120858, dated Sep. 11, 2019, 6 pages.

PCT International Search Report and Written Opinion in International Application No. PCT/CN2018/120870, dated Sep. 11, 2019, 8 pages.

PCT International Search Report and Written Opinion in International Application No. PCT/CN2018/120873, dated Jul. 31, 2019, 6 pages.

Extended European Search Report in European Application No. 18866754.7, dated Oct. 11, 2019, 11 pages.

Dimakis et al., "Network Coding for Distributed Storage Systems," IEEE Transactions on Information Theory, Sep. 2010, 56(9):4539-4551.

Extended European Search Report in European Application No. 18866176.3, Feb. 24, 2020, 8 pages.

\* cited by examiner

Initial<epoch, tx_root_hash, ec_block_hash, ec_block, seq, j>
Echo<epoch, tx_root_hash, ec_block_hash, ec_block, seq, sign_proof, j>
Accept<epoch, tx_root_hash, seq, sign_proofs, j>

FIG. 6

Epoch_change <weight, epoch+1, Echo{}, Accept{}, j>
Echo {<epoch, seq, sign_proof, j>}
Accept {<epoch, tx_root_hash, sign_proofs, seq, j>}
New_epoch <epoch+1, i, j, seq, ec_digest>

FIG. 9

Query_state <j, seq>
Reply_state <j, last_seq>
Fetch_echo <j, last_seq+1>

FIG. 12

PERFORMING A RECOVERY PROCESS FOR A NETWORK NODE IN A DISTRIBUTED SYSTEM

CROSS-REFERENCE TO RELATED APPLICATIONS

This application is a continuation of PCT Application No. PCT/CN2018/120870, filed on Dec. 13, 2018, which is hereby incorporated by reference in its entirety.

BACKGROUND

Distributed ledger systems (DLSs), which can also be referred to as consensus networks, and/or blockchain networks, enable participating entities to securely, and immutably store data. DLSs are commonly referred to as blockchain networks without referencing any particular user case. Examples of blockchain networks can include: public blockchain networks, private blockchain networks, and consortium blockchain networks. A public blockchain network is open for all entities to use the DLS, and participate in the consensus process. A private blockchain network is provided for particular entity, which centrally controls read and write permissions. A consortium blockchain network is provided for a select group of entities, which control the consensus process, and includes an access control layer.

Consensus mechanisms are a primary component of distributed blockchain systems. A consensus mechanism is a process in computer science that is used to achieve agreement on a single data value among distributed processes or systems. Consensus mechanisms are designed to achieve reliability in a network involving multiple unreliable nodes. Solving that issue—known as consensus problem—is important in distributed computing and multi-agent systems.

Blockchain relies on consensus mechanisms to reach agreement among nodes. A blockchain is a decentralized database that is managed by distributed computers on a peer-to-peer (P2P) network. Each peer maintains a copy of the ledger to prevent a single point of failure (SPOF). Updates and validations are reflected in all copies simultaneously.

Although a number of existing techniques can be used for performing consensus among the network nodes of a blockchain system, a more efficient solution for performing the consensus would be advantageous.

SUMMARY

Implementations of the present specification include computer-implemented methods for addressing consensus issues in a distributed system (e.g., a blockchain network). More particularly, implementations of the present specification are directed to performing a recovery process for a network node in a distributed system.

In some implementations, actions include: broadcasting a state request message to a number of network nodes of the blockchain network by a network node of the blockchain network, wherein the network node is to recover a target transaction of a target sequence number; receiving a number of state reply messages by the network node from the number of network nodes, wherein each of the number of state reply messages includes a sequence number; identifying the target sequence number by the network node based on the same sequence number in response to determining that a number of state reply messages exceeds a pre-determined threshold, wherein each of the number of the state reply messages includes a same sequence number; sending a requesting message to the plurality of network nodes by the network node, wherein the requesting message requests an ECHO message from each of the number of network nodes, wherein the ECHO message is a message transmitted by the each of the number of network nodes for achieving a consensus among the number of network nodes on the target transaction having the target sequence number, and the ECHO message includes a part of the target transaction and a signature of the each of the plurality of network nodes; receiving a number of ECHO messages by the network node from the plurality of network nodes; determining a number of valid ECHO messages out of the plurality of ECHO messages by the network node, wherein each of the number of valid ECHO messages includes the target sequence number; recovering the target transaction having the target sequence number at the network node based on the number of valid ECHO messages in response to determining that the number of valid ECHO messages exceeds a pre-determined threshold; sending a message to the plurality of network nodes by the network node indicating the network node has been recovered.

Other implementations include corresponding systems, apparatus, and computer programs, configured to perform the actions of the methods, encoded on computer storage devices.

These and other implementations may each optionally include one or more of the following features:

A first feature, combinable with any of the following features, wherein the number of network nodes includes a primary node and one or more backup nodes.

A second feature, combinable with any of the following features, wherein the network node is a primary node or a backup node.

A third feature, combinable with any of the following features, wherein the requesting message includes the target sequence number.

A fourth feature, combinable with any of the following features, wherein each of the number of network nodes other than the network node verifies the requesting message before sending the ECHO messages to the network node.

A fifth feature, combinable with any of the following features, wherein the network node verifies whether each of the ECHO messages is valid using a Merkel tree.

A sixth feature, combinable with any of the following features, wherein the network node further verifies whether the signature in the ECHO message is valid A seventh feature, combinable with any of the following features, wherein each of the ECHO messages further includes at least one of a number of erasure code (EC) blocks associated with the target transaction, wherein the number of EC blocks are generated according to an EC code using the target transaction.

An eighth feature, combinable with any of the following features, wherein the network node reconstructs the target transaction using a subset of the number of EC blocks that are in the number of valid ECHO messages.

A ninth feature, combinable with any of the following features, wherein the message to the number of network nodes indicating the network node has been recovered includes a set of signatures in the number of valid ECHO messages and the target sequence number.

The present specification also provides one or more non-transitory computer-readable storage media coupled to one or more processors and having instructions stored thereon which, when executed by the one or more processors, cause the one or more processors to perform operations in accordance with implementations of the methods provided herein.

The present specification further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

The present specification discloses improved consensus mechanisms including techniques for achieving consensus among network nodes in a distributed system, performing a change of primary node in a distributed system, and performing a recovery process for a network node in a distributed system. The described consensus mechanisms can achieve various advantages in different applications.

For example, the consensus process as discussed below includes many features that improve the operations of the blockchain system and help alleviate the network bottleneck. For example, the described consensus process includes converting a transaction request into a number of erasure code (EC) blocks according to an EC code and sending one of the EC blocks to each of the network nodes. The EC block is smaller in size than the original transaction request. Accordingly, sending the EC block instead of the full transaction request to the network nodes reduces the size of data blocks that are transmitted among the network nodes of the blockchain network, thereby conserving the network bandwidth and reducing the network load. This further reduces the size of data that are written to and read from the memory space of the network nodes, thereby reducing a burden on the memory space of the network nodes and improving the efficiency of the overall blockchain system.

Furthermore, the present specification describes an epoch change process that includes assigning respective weights to multiple phases of the consensus process, determining a weight sum based on the respective weights of the multiple phases, and determining a new primary node based on the weight sum. The epoch change process based on the weigh sum instead of a round robin method can facilitate choosing a new primary node that is non-faulty in a timely manner. Unlike the round robin method, the epoch change process in the present specification relies on the weight sum to select the new primary node, which can reduce latency or delay in finding the new primary node that is not faulty. This can further improve the efficiency of the overall blockchain system in providing the blockchain services.

Moreover, the present specification discusses a recovery process that includes operations such as sending a state request message by a network node that applies to be a new primary node and receiving state reply messages from the other network nodes. These operations are performed such that the recovery process of the faulty network node does not interfere with the normal operation of the consensus process among the other non-faulty network nodes. This facilitates conserving computing and network resources for recovering the faulty network node by reducing the complexity of the recovery process.

It is acknowledged that methods in accordance with the present specification may include any combination of the aspects and features described herein. That is, methods in accordance with the present specification are not limited to the combinations of aspects and features specifically described herein, but also include any combination of the aspects and features provided.

The details of one or more implementations of the present specification are set forth in the accompanying drawings and the description below. Other features and advantages of the present specification will be apparent from the description and drawings, and from the claims.

DESCRIPTION OF DRAWINGS

FIG. 6 depicts an example of messages that are communicated among network nodes of a distributed system in accordance with implementations of the present specification.

FIG. 9 depicts an example of messages that are communicated among network nodes of a distributed system in accordance with implementations of the present specification.

FIG. 12 depicts an example of messages that are communicated among network nodes of a distributed system in accordance with implementations of the present specification.

Like reference symbols in the various drawings indicate like elements.

DETAILED DESCRIPTION

Figure 1:
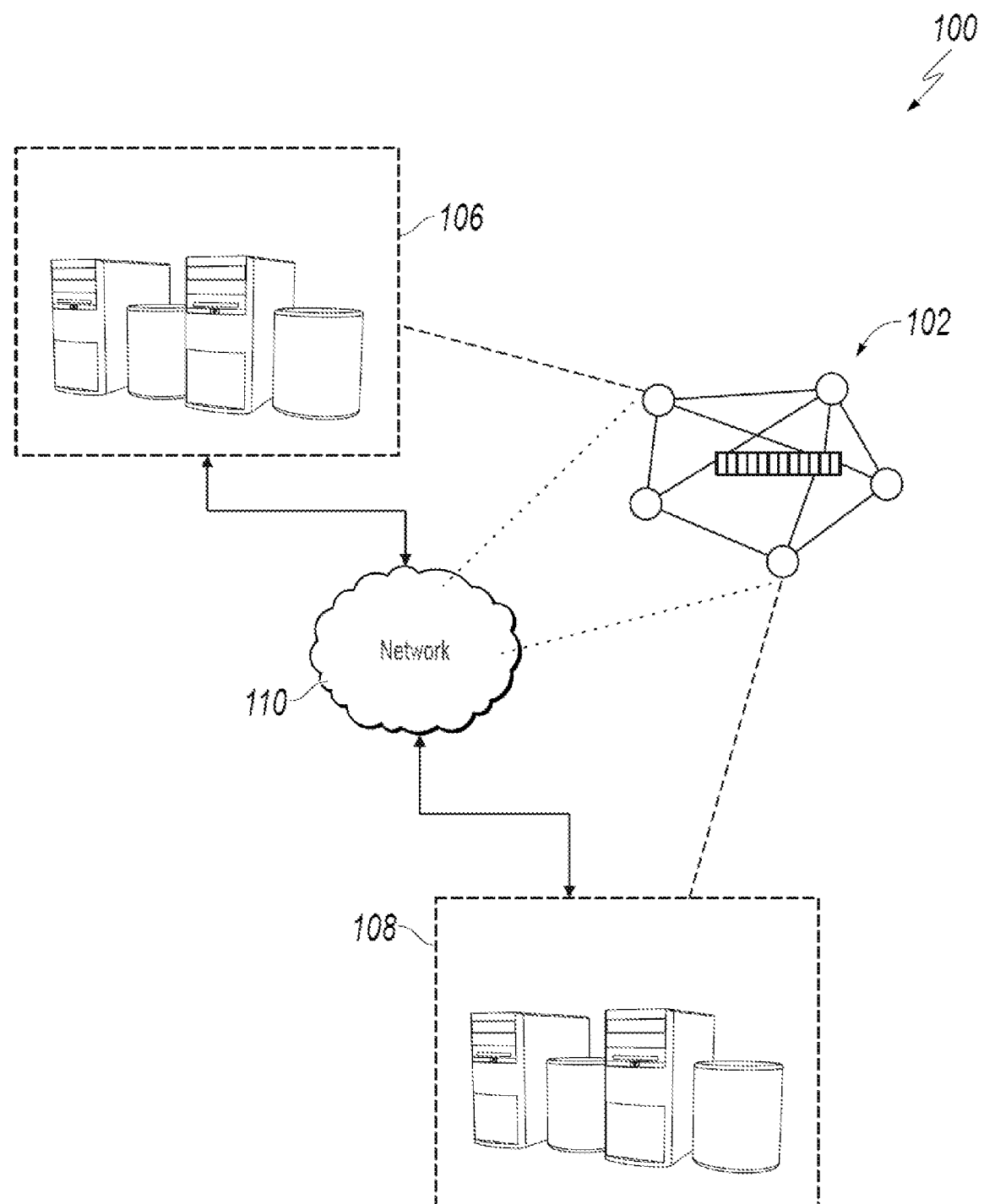
FIG. 1 depicts an example of an environment that can be used to execute implementations of the present specification.

Implementations of the present specification include computer-implemented methods for addressing consensus issues in a distributed system (e.g., a blockchain network). More particularly, implementations of the present specification are directed to performing a recovery process for a network node in a distributed system.

In some implementations, actions include: broadcasting a state request message to a number of network nodes of the blockchain network by a network node of the blockchain network, wherein the network node is to recover a target transaction of a target sequence number; receiving a number of state reply messages by the network node from the number of network nodes, wherein each of the number of state reply messages includes a sequence number; identifying the target sequence number by the network node based on the same sequence number in response to determining that a number of state reply messages exceeds a pre-determined threshold, wherein each of the number of the state reply messages includes a same sequence number; sending a requesting message to the plurality of network nodes by the network node, wherein the requesting message requests an ECHO message from each of the number of network nodes, wherein the ECHO message is a message transmitted by the each of the number of network nodes for achieving a consensus among the number of network nodes on the target transaction having the target sequence number, and the ECHO message includes a part of the target transaction and a signature of the each of the plurality of network nodes; receiving a number of ECHO messages by the network node from the plurality of network nodes; determining a number of valid ECHO messages out of the plurality of ECHO messages by the network node, wherein each of the number of valid ECHO messages includes the target sequence number; recovering the target transaction having the target sequence number at the network node based on the number of valid ECHO messages in response to determining that the number of valid ECHO messages exceeds a pre-determined threshold; sending a message to the plurality of network nodes by the network node indicating the network node has been recovered.

To provide further context for implementations of the present specification, and as introduced above, distributed ledger systems (DLSs), which can also be referred to as consensus networks (e.g., made up of peer-to-peer nodes) or blockchain networks, enable participating entities to securely, and immutably conduct transactions, and store data. The term blockchain is used herein to generally refer to a DLS without reference to any particular use case. As introduced above, a blockchain network can be provided as a public blockchain network, a private blockchain network, or a consortium blockchain network.

A blockchain is a data structure that stores transactions in a way that allows future transactions to be verified for consistency with all prior transactions stored in the chain. A blockchain includes one or more blocks. Each block in the chain is linked to a previous block immediately before it in the chain by including a cryptographic hash of the previous block. Each block also includes a timestamp, its own cryptographic hash, and one or more transactions. The transactions, which have already been verified by the nodes of the blockchain network, are hashed and encoded into a Merkle tree. A Merkle tree is a data structure in which data at the leaf nodes of the tree is hashed, and all hashes in each branch of the tree are concatenated at the root of the branch. This process continues up the tree to the root of the entire tree, which stores a hash that is representative of all data in the tree. A hash purporting to be of a transaction stored in the tree can be quickly verified by determining if it is consistent with the structure of the tree.

Whereas a blockchain is a data structure for storing transactions, a blockchain network is a network of computing nodes that manage, update, and maintain one or more blockchain structures. As introduced above, a blockchain network can be provided as a public blockchain network, a private blockchain network, or a consortium blockchain network.

In a public blockchain network, the consensus process is controlled by nodes of the consensus network. For example, hundreds, thousands, even millions of entities can cooperate in a public blockchain network, each of which operates at least one node in the public blockchain network. Accordingly, the public blockchain network can be considered a public network with respect to the participating entities. In some examples, a majority of entities (nodes) must sign every block in order for the block to be valid, and added to the blockchain (distributed ledger) of the blockchain network. Example public blockchain networks include particular peer-to-peer payment networks that leverage a distributed ledger, referred to as blockchain. As noted above, the term blockchain, however, is used to generally refer to distributed ledgers without particular reference to any particular blockchain network.

In general, a public blockchain network supports public transactions. A public transaction is shared with all of the nodes within the public blockchain network, and are stored in a global blockchain. A global blockchain is a blockchain that is replicated across all nodes. That is, all nodes are in perfect state consensus with respect to the global blockchain. To achieve consensus (e.g., agreement to the addition of a block to a blockchain), a consensus protocol is implemented within the public blockchain network. Examples of consensus protocols include, without limitation, proof-of-work (POW), proof-of-stake (POS), and proof-of-authority (POA). POW is referenced further herein as a non-limiting example.

In general, a private blockchain network is provided for a particular entity, which centrally controls read and write permissions. The entity controls which nodes are able to participate in the blockchain network, thus, private blockchain networks are generally referred to as permissioned networks that place restrictions on who is allowed to participate in the network, and on their level of participation (e.g., only in certain transactions). Various types of access control mechanisms can be used (e.g., existing participants vote on adding new entities, a regulatory authority can control admission).

In general, a consortium blockchain network is private among the participating entities. In a consortium blockchain network, the consensus process is controlled by an authorized set of nodes, one or more nodes being operated by a respective entity (e.g., a financial institution, insurance company). For example, a consortium of ten (10) entities (e.g., financial institutions, insurance companies) can operate a consortium blockchain network, each of which operates at least one node in the consortium blockchain network. Accordingly, the consortium blockchain network can be considered a private network with respect to the participating entities. In some examples, each entity (node) must sign every block in order for the block to be valid, and added to the blockchain. In some examples, at least a sub-set of entities (nodes) (e.g., at least 7 entities) must sign every block in order for the block to be valid, and added to the blockchain.

Implementations of the present specification are described in further detail herein with reference to a consortium blockchain network. It is contemplated, however, that implementations of the present specification can be realized in any appropriate type of blockchain network.

Implementations of the present specification are described in further detail herein in view of the above context. More particularly, and as introduced above, implementations of the present specification are directed to performing a recovery process for a network node in a distributed system.

A blockchain is a tamper-proof, shared digital ledger that records transactions in a public or private peer-to-peer network. The ledger is distributed to all member nodes in the network, and the history of asset transactions occurring in the network is permanently recorded in the block.

Consensus mechanisms ensure that all network nodes in a distributed blockchain network execute transactions in the same order and then write into the same ledgers. One issue that the consensus models aim to address is to overcome *Byzantine* failures. In a *Byzantine* failure, a component such as a server or a network node of a distributed blockchain network can inconsistently appear both failed and functioning to failure-detection systems, presenting different symptoms to different observers. It is difficult for the other network nodes to declare it failed and shut it out of the network, because they need to first reach a consensus regarding which network node has failed in the first place.

In the context of distributed systems, *Byzantine* fault tolerance (BFT) is the ability of a distributed computer network to function as desired and correctly reach a sufficient consensus despite malicious components (i.e., network nodes of a blockchain network) of the system failing or propagating incorrect information to other peers. The objective is to defend against catastrophic system failures by mitigating the influence these malicious nodes have on the correct function of the network and the right consensus that is reached by the honest nodes in the system.

However, the existing BFT mechanisms have proven inefficient in many aspects. For example, the existing BFT mechanisms have added complexity of implementation to the distributed blockchain network when attempting to overcome the *Byzantine* failures such that latency is increased for the communication among the network nodes of the distributed blockchain network. Practical *Byzantine* Fault Tolerance (PBFT) is one of the optimizations that aims to improve upon the existing BFT consensus mechanisms. The PBFT model focuses on providing a practical *Byzantine* state machine replication that tolerates *Byzantine* faults (malicious nodes) through an assumption that there are independent node failures and manipulated messages that are propagated by specific, independent nodes.

In the PBFT model, all of the nodes are ordered in a sequence with one node being the primary node (leader) and the others referred to as the backup nodes. All of the nodes within the system communicate with each other and the goal is for a majority of the honest nodes to come to an agreement of the state of the system. Nodes communicate with each other, and not only have to prove that messages came from a specific peer node, but also need to verify that the message was not modified during transmission.

For the PBFT model to work, the assumption is made that the amount of malicious nodes in the network cannot simultaneously equal or exceed ⅓ of the overall nodes in the system in a given window of vulnerability. The more nodes in the system, then the more mathematically unlikely it is for a number approaching ⅓ of the overall nodes to be malicious. The algorithm effectively provides both liveness and safety as long as at most $(n-1)/3$ nodes are malicious or faulty at the same time, where n represents total nodes.

Each round of PBFT consensus (called views) includes 4 phases:

(1) A client sends a request to the leader node to invoke a service operation;

(2) The leader node multicasts the request to the backup nodes;

(3) The nodes execute the request and then send a reply to the client; and (4) The client awaits for f+1 (f represents the maximum number of nodes that may be faulty) replies from different nodes with the same result.

The final result is that all honest nodes come to an agreement on the order of the record and they either accept or reject it. The leader node is changed in a round robin scheme during every view and can even be replaced with a protocol called view change if a specific amount of time has passed without the leader node multicasting the request. A majority of honest nodes can also decide whether a leader is faulty and remove them with the next leader in line as the replacement.

However, there are some limitations to the PBFT consensus mechanism. For example, the PBFT model may work well in its classical form with relatively small consensus group sizes due to cumbersome amount of communication that is required between the nodes. The bulky block data that are transmitted between the network nodes cause a network load issue and lead to a network bottleneck. Furthermore, using method authentication codes (MAC) as the format for authentication messages in the PBFT model can be inefficient with the amount of communication needed between the nodes in large consensus groups such as cryptocurrency networks and with MACs. There could be an inherent inability to prove the authenticity of messages to a third party.

Moreover, encountering consecutive malicious nodes when changing the leader node using a round robin method used by PBFT affects the blockchain service by introducing latency or delay in finding a leader node that is honest. For example, when selecting a first network node as the new leader node, the first network node may be a malicious node therefore cannot be selected as the new leader node. In a round robin method, a second network node in line may be selected as the new leader node. However, if the second network node is also a malicious node, another network node in line will be verified as whether it is suitable to be the leader node. This process continues until a new leader node that is honest is identified. Such frequent change of the leader node introduces significant latency in blockchain services.

Furthermore, the network nodes in a blockchain network may experience *Byzantine* fault or crash fault at any time. For example, a network node may be compromised by a malicious cyber attacker and behave improperly. If the network nodes that are compromised are not recovered promptly, the malicious cyber attacker may compromise the blockchain network and services by corrupting more than ⅓ of the network nodes without being detected.

To address the above-described issues and concerns associated with the existing BFT consensus mechanisms and the PBFT consensus mechanism, the present specification discloses improved consensus mechanisms including techniques for achieving consensus among network nodes in a distributed system, performing a change of primary node in a distributed system, and performing a recovery process for a network node in a distributed system. The described consensus mechanisms can achieve various advantages in different applications.

For example, the consensus process as discussed below includes many features that improve the operations of the blockchain system and help alleviate the network bottleneck. For example, the described consensus process includes converting a transaction request into a number of erasure code (EC) blocks according to an EC code and sending one of the EC blocks to each of the network nodes. The EC block is smaller in size than the original transaction request. Accordingly, sending the EC block instead of the full transaction request to the network nodes reduces the size of data blocks that are transmitted among the network nodes of the blockchain network, thereby conserving the network bandwidth and reducing the network load. This further reduces the size of data that are written to and read from the memory space of the network nodes, thereby reducing a burden on the memory space of the network nodes and improving the efficiency of the overall blockchain system.

Furthermore, the present specification describes an epoch change process that includes assigning respective weights to multiple phases of the consensus process, determining a weight sum based on the respective weights of the multiple phases, and determining a new primary node based on the weight sum. The epoch change process based on the weigh sum instead of a round robin method can facilitate choosing a new primary node that is non-faulty in a timely manner. A primary node may be a leader node that has the authority to initiate a round of consensus process among a number of network nodes including the primary node. The other network nodes of the blockchain network can be referred to as backup nodes. The epoch change process can help address the issue of the round robin method that cause a frequent change of primary node when multiple network nodes in line for the new primary node are faulty. Unlike the round robin method, the epoch change process in the present specification relies on the weight sum to select the new primary node, which can reduce latency or delay in finding the new primary node that is not faulty. This can further improve the efficiency of the overall blockchain system in providing the blockchain services.

Moreover, the present specification discusses a recovery process that includes operations such as sending a state request message by a network node that applies to be a new primary node and receiving state reply messages from the other network nodes. These operations are performed such that the recovery process of the faulty network node does not interfere with the normal operation of the consensus process among the other non-faulty network nodes. This facilitates conserving computing and network resources for recovering the faulty network node by reducing the complexity of the recovery process.

FIG. 1 depicts an example of an environment 100 that can be used to execute implementations of the present specification. In some examples, the environment 100 enables entities to participate in a consortium blockchain network 102. The environment 100 includes computing devices or systems 106, 108, and a network 110. In some examples, the network 110 includes a local area network (LAN), wide area network (WAN), the Internet, or a combination thereof, and connects web sites, user devices (e.g., computing devices), and back-end systems. In some examples, the network 110 can be accessed over a wired and/or a wireless communications link. In some examples, the network 110 enables communication with, and within the consortium blockchain network 102. In general the network 110 represents one or more communication networks. In some cases, the computing devices 106, 108 can be nodes of a cloud computing system (not shown), or can each computing device 106, 108 be a separate cloud computing system including a plurality of computers interconnected by a network and functioning as a distributed processing system.

In the depicted example, the computing systems 106, 108 can each include any appropriate computing system that enables participation as a node in the consortium blockchain network 102. Example computing devices include, without limitation, a server, a desktop computer, a laptop computer, a tablet computing device, and a smartphone. In some examples, the computing systems 106, 108 hosts one or more computer-implemented services for interacting with the consortium blockchain network 102. For example, the computing system 106 can host computer-implemented services of a first entity (e.g., user A), such as transaction management system that the first entity uses to manage its transactions with one or more other entities (e.g., other users). The computing system 108 can host computer-implemented services of a second entity (e.g., user B), such as transaction management system that the second entity uses to manage its transactions with one or more other entities (e.g., other users). In the example of FIG. 1, the consortium blockchain network 102 is represented as a peer-to-peer network of nodes, and the computing systems 106, 108 provide nodes of the first entity, and second entity respectively, which participate in the consortium blockchain network 102.

Figure 2:
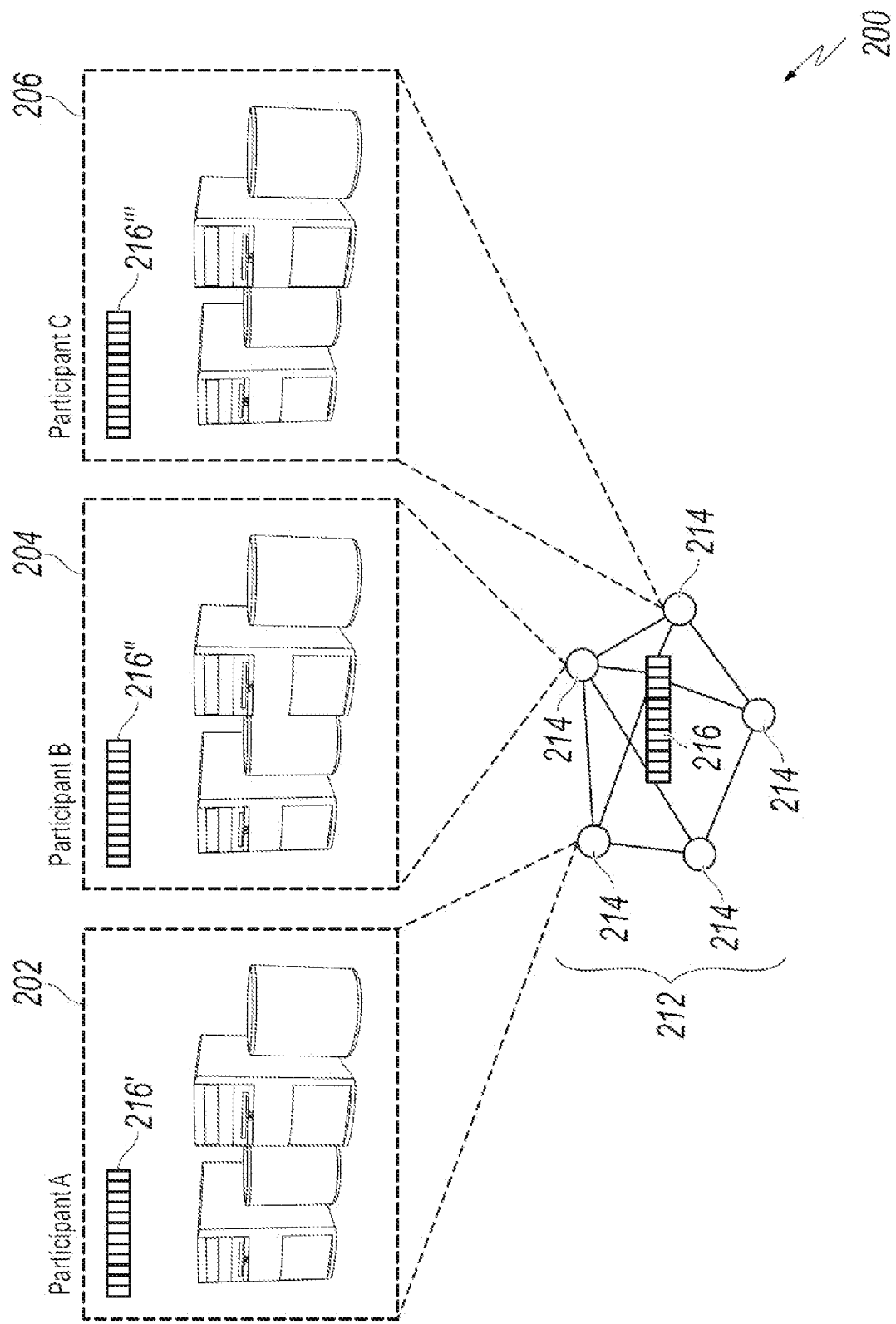
FIG. 2 depicts an example of a conceptual architecture in accordance with implementations of the present specification.

FIG. 2 depicts an example of a conceptual architecture 200 in accordance with implementations of the present specification. The example of a conceptual architecture 200 includes participant systems 202, 204, 206 that correspond to Participant A, Participant B, and Participant C, respectively. Each participant (e.g., user, enterprise) participates in a blockchain network 212 provided as a peer-to-peer network including a plurality of nodes 214, at least some of which immutably record information in a blockchain 216. Although a single blockchain 216 is schematically depicted within the blockchain network 212, multiple copies of the blockchain 216 are provided, and are maintained across the blockchain network 212, as described in further detail herein.

In the depicted example, each participant system 202, 204, 206 is provided by, or on behalf of Participant A, Participant B, and Participant C, respectively, and functions as a respective node 214 within the blockchain network. As used herein, a node generally refers to an individual system (e.g., computer, server) that is connected to the blockchain network 212, and enables a respective participant to participate in the blockchain network. In the example of FIG. 2, a participant corresponds to each node 214. It is contemplated, however, that a participant can operate multiple nodes 214 within the blockchain network 212, and/or multiple participants can share a node 214. In some examples, the participant systems 202, 204, 206 communicate with, or through the blockchain network 212 using a protocol (e.g., hypertext transfer protocol secure (HTTPS)), and/or using remote procedure calls (RPCs).

Nodes 214 can have varying degrees of participation within the blockchain network 212. For example, some nodes 214 can participate in the consensus process (e.g., as minder nodes that add blocks to the blockchain 216), while other nodes 214 do not participate in the consensus process. As another example, some nodes 214 store a complete copy of the blockchain 216, while other nodes 214 only store copies of portions of the blockchain 216. For example, data access privileges can limit the blockchain data that a respective participant stores within its respective system. In the example of FIG. 2, the participant systems 202, 204, 206 store respective, complete copies 216', 216", 216'" of the blockchain 216.

A blockchain (e.g., the blockchain 216 of FIG. 2) is made up of a chain of blocks, each block storing data. Examples of data include transaction data representative of a transaction between two or more participants. While transactions are used herein by way of non-limiting example, it is contemplated that any appropriate data can be stored in a blockchain (e.g., documents, images, videos, audio). Examples of transactions can include, without limitation, exchanges of something of value (e.g., assets, products, services, and currency). The transaction data is immutably stored within the blockchain. That is, the transaction data cannot be changed.

Before storing in a block, the transaction data is hashed. Hashing is a process of transforming the transaction data (provided as string data) into a fixed-length hash value (also provided as string data). It is not possible to un-hash the hash value to obtain the transaction data. Hashing ensures that even a slight change in the transaction data results in a completely different hash value. Further, and as noted above, the hash value is of fixed length. That is, no matter the size of the transaction data the length of the hash value is fixed. Hashing includes processing the transaction data through a hash function to generate the hash value. An example of hash function includes, without limitation, the secure hash algorithm (SHA)-256, which outputs 256-bit hash values.

Transaction data of multiple transactions are hashed and stored in a block. For example, hash values of two transactions are provided, and are themselves hashed to provide another hash. This process is repeated until, for all transactions to be stored in a block, a single hash value is provided. This hash value is referred to as a Merkle root hash, and is stored in a header of the block. A change in any of the transactions will result in change in its hash value, and ultimately, a change in the Merkle root hash.

Blocks are added to the blockchain through a consensus protocol. Multiple nodes within the blockchain network participate in the consensus protocol, and compete to have a block added to the blockchain. Such nodes are referred to as miners (or minder nodes). POW, introduced above, is used as a non-limiting example.

The miner nodes execute the consensus process to add transactions to the blockchain. Although multiple miner nodes participate in the consensus process, only one miner node can write the block to the blockchain. That is, the miner nodes compete in the consensus process to have their block added to the blockchain. In further detail, a miner node periodically collects pending transactions from a transaction pool (e.g., up to a predefined limit on the number of transactions that can be included in a block, if any). The transaction pool includes transaction messages from participants in the blockchain network. The miner node constructs a block, and adds the transactions to the block. Before adding the transactions to the block, the miner node checks whether any of the transactions are already included in a block of the blockchain. If a transaction is already included in another block, the transaction is discarded.

The miner node generates a block header, hashes all of the transactions in the block, and combines the hash value in pairs to generate further hash values until a single hash value is provided for all transactions in the block (the Merkle root hash). This hash is added to the block header. The miner also determines the hash value of the most recent block in the blockchain (i.e., the last block added to the blockchain). The miner node also adds a nonce value, and a timestamp to the block header. In a mining process, the miner node attempts to find a hash value that meets required parameters. The miner node keeps changing the nonce value until finding a hash value that meets the required parameters.

Every miner in the blockchain network attempts to find a hash value that meets the required parameters, and, in this way, compete with one another. Eventually, one of the miner nodes finds a hash value that meets the required parameters, and advertises this to all other miner nodes in the blockchain network. The other miner nodes verify the hash value, and if determined to be correct, verifies each transaction in the block, accepts the block, and appends the block to their copy of the blockchain. In this manner, a global state of the blockchain is consistent across all miner nodes within the blockchain network. The above-described process is the POW consensus protocol.

A non-limiting example is provided with reference to FIG. 2. In this example, Participant A wants to send an amount of fund to Participant B. Participant A generates a transaction message (e.g., including From, To, and Value fields), and sends the transaction message to the blockchain network, which adds the transaction message to a transaction pool. Each miner node in the blockchain network creates a block, and takes all transactions from the transaction pool (e.g., up to a predefined limit on the number of transaction that can be added to a block, if any), and adds the transactions to the block. In this manner the transaction published by Participant A is added to the blocks of the miner nodes.

In some blockchain networks, cryptography is implemented to maintain privacy of transactions. For example, if two nodes want to keep a transaction private, such that other nodes in the blockchain network cannot discern details of the transaction, the nodes can encrypt the transaction data. Examples of cryptographic methods include, without limitation, symmetric encryption, and asymmetric encryption. Symmetric encryption refers to an encryption process that uses a single key for both encryption (generating ciphertext from plaintext), and decryption (generating plaintext from ciphertext). In symmetric encryption, the same key is available to multiple nodes, so each node can en-/de-crypt transaction data.

Asymmetric encryption uses keys pairs that each include a private key, and a public key, the private key being known only to a respective node, and the public key being known to any or all other nodes in the blockchain network. A node can use the public key of another node to encrypt data, and the encrypted data can be decrypted using other node's private key. For example, and referring again to FIG. 2, Participant A can use Participant B's public key to encrypt data, and send the encrypted data to Participant B. Participant B can use its private key to decrypt the encrypted data (ciphertext) and extract the original data (plaintext). Messages encrypted with a node's public key can only be decrypted using the node's private key.

Asymmetric encryption is used to provide digital signatures, which enables participants in a transaction to confirm other participants in the transaction, as well as the validity of the transaction. For example, a node can digitally sign a message, and another node can confirm that the message was sent by the node based on the digital signature of Participant A. Digital signatures can also be used to ensure that messages are not tampered with in transit. For example, and again referencing FIG. 2, Participant A is to send a message to Participant B. Participant A generates a hash of the message, and then, using its private key, encrypts the hash to provide a digital signature as the encrypted hash. Participant A appends the digital signature to the message, and sends the message with digital signature to Participant B. Participant B decrypts the digital signature using the public key of Participant A, and extracts the hash. Participant B hashes the message and compares the hashes. If the hashes are same, Participant B can confirm that the message was indeed from Participant A, and was not tampered with.

Figure 3:
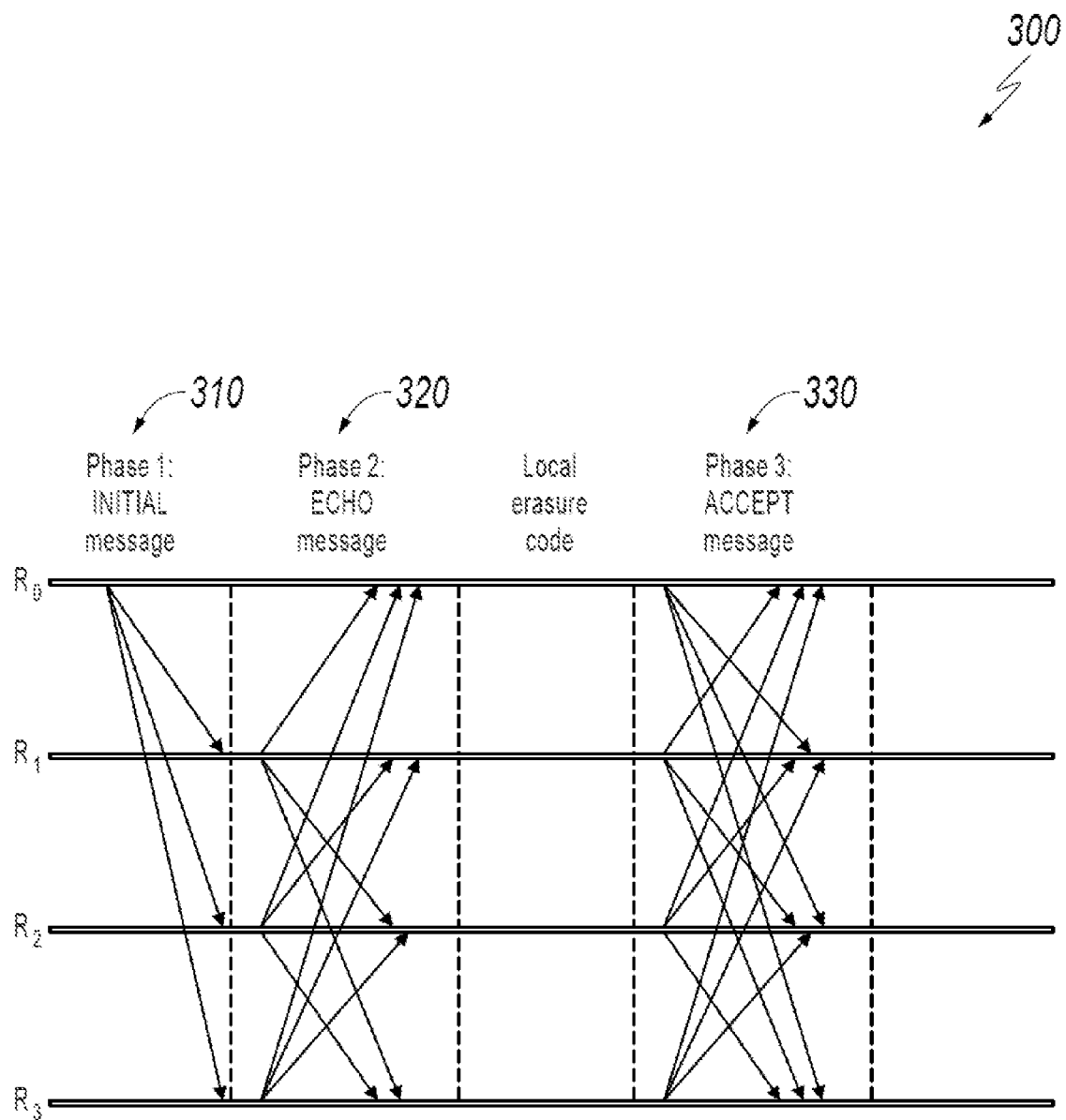
FIG. 3 depicts an example of a consensus process that can be executed in accordance with implementations of the present specification.

FIG. 3 depicts an example of a process 300 for achieving consensus among network nodes (e.g., node 214) of a distributed system (e.g., blockchain network 102 and 212) that can be executed in accordance with implementations of the present specification. Specifically, FIG. 3 illustrates a diagram presenting an exemplary embodiment of a method 300 of achieving consensus in a normal case, according to the present specification. As illustrated in FIG. 3, the consensus process 300 includes three phases or stages 310, 320, and 330 as discussed below.

In a first phase 310 of the consensus process 300, a primary node (or a leader node) of the blockchain network sends a first message to the other network nodes (i.e., the backup nodes). The first message indicates that the primary node is initiating a consensus process. For example, as illustrated in FIG. 3, the primary node $R_0$ sends an INITIAL message to other networks nodes $R_1$, $R_2$, and $R_3$ in the blockchain network. Note that process 300 is illustrated as including four network nodes $R_0$, $R_1$, $R_2$, and $R_3$ for illustrative purposes only, process 300 may include any suitable number of network nodes. The first phase and a format of the INITIAL message will be discussed below in greater detail with reference to FIGS. 4-6.

In a second phase 320 of the consensus process 300, each of the backup nodes receives the first message that is sent by the primary node, prepares a second message in response to the first message, and multicasts the second message to the other network node. The second message indicates that the backup node has received the first message from the primary node and is sending a reply in response to the first message. For example, as illustrated in FIG. 3, the backup node $R_1$ receives the INITIAL message that is sent by the primary node $R_0$, and replies to the primary node $R_0$ with an ECHO message as an example of the second message. Meanwhile, the backup node $R_1$ also multicasts the ECHO message to the other backup nodes, such as, backup nodes $R_2$ and $R_3$. Similarly, backup node $R_2$ and $R_3$ each multicasts an ECHO message to the other network nodes including the primary node $R_0$.

When a network node, for example such as a primary node or a backup node, receives the ECHO messages from the other network nodes, the network node may verify the information in the ECHO messages. The second phase and a format of the ECHO message will be discussed below in greater detail with reference to FIGS. 4-6.

In a third phase 330 of the consensus process 300, each of the network nodes multicasts a third message to the other network nodes. The third message indicates that a network node has accepted a predetermined number of the second messages. In some implementations, the third message can indicate that the network node is ready to execute the transaction. In some implementations, the third message can indicate that the transaction has been successfully reconstructed at the network node. For example, as illustrated in FIG. 3, the primary node $R_0$ multicasts an ACCEPT message to the backup nodes $R_1$, $R_2$, and $R_3$. Similarly, the backup nodes $R_1$, $R_2$, and $R_2$ each multicasts an ACCEPT message to the other network nodes. In some implementations of the present specification, before multicasting the ACCEPT message, a network node determines whether the ACCEPT is sent according to an erasure code (EC) and the information in the ECHO messages are that received in the second phase. The third phase, the EC code, and a format of the ACCEPT message will be discussed below in greater detail with reference to FIGS. 4-6.

When a network node receives enough ACCEPT messages from the other network nodes, the network node determines that a consensus has been achieved. For example, if the primary node $R_0$ or the backup nodes $R_1$, $R_2$, or $R_3$ receives a quorum (e.g., 2f+1, where f represents a number of faulty network nodes) number of ACCEPT messages, a consensus is achieved automatically among the network nodes.

Figure 4:
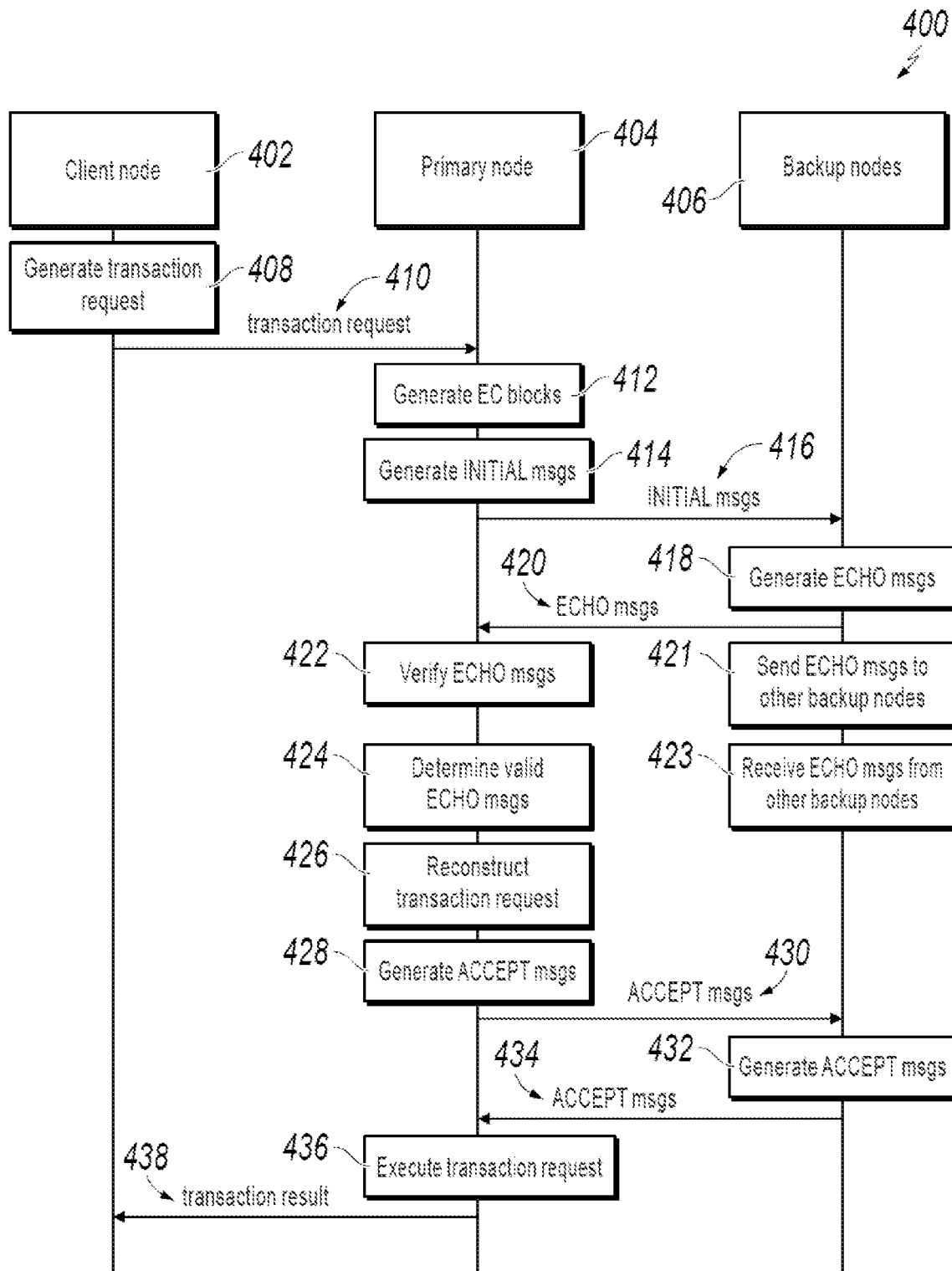
FIG. 4 depicts an example of a consensus process that can be executed in accordance with implementations of the present specification.

FIG. 4 depicts an example of a process 400 for achieving consensus among network nodes (e.g., node 214 or nodes $R_0$, $R_1$, $R_2$, and $R_3$) of a distribute system (e.g., blockchain network 102 or 212) that can be executed in accordance with implementations of the present specification. In some implementations, the process 400 may be performed using one or more computer-executable programs executed using one or more computing devices. For clarity of presentation, the description that follows generally describes method 400 in the context of the other figures in this description. It will be understood that method 400 may be performed, for example, by any suitable system, environment, software, and hardware, or a combination of systems, environments, software, and hardware, as appropriate. In some implementations, various steps of method 400 can be run in parallel, in combination, in loops, or in any order.

At the outset, the process 400 may be implemented in conjunction with the system 100-300 as illustrated in FIGS. 1-3. In some implementations of the present specification, the blockchain network 102 and/or 212 includes a primary node 404 and one or more backup nodes 406. The blockchain network 102 and/or 212 communicates with the computing system 106 and/or 108, such as, client nodes 402 via network 110 to provide blockchain services. Each of the client node 402, primary node 404, and backup node 406 can be a special purpose computer or other data processing apparatus configured to perform the processes discussed herein. For example, the client node 402 can also referred to as a client terminal or a client device that interacts with a blockchain network. The client node 402 can install, for example, a client application or a client software development kit (SDK) in connection with the blockchain network for accessing and communicating with the blockchain network. The primary node 404 and one or more backup nodes 406 can also be referred to as consensus nodes or network nodes that achieve consensus and immutably record information in the blockchain network.

Process 400 starts at 408 where the client node 402 generates a transaction request. In some implementations of the present specification, the transaction request can include a request requesting a blockchain service from the blockchain network 102 and/or 212.

At 410, the client node 402 multicasts the transaction request to the primary node 404 of the blockchain network 102 and/or 212. In some implementations of the present specification, the primary node 404 assigns a sequence number to the transaction request to keep track of transaction requests after receiving the transaction request from the client node 402.

At 412, the primary node 404 generates a number of EC blocks after receiving the transaction request from the client node 402. In some implementations of the present specification, the primary node 404 generates the number of EC blocks according to an EC code using the transaction request. For example, referring to FIG. 5, the primary node 404 applies an EC code 504 on a transaction request 502 and transforms the transaction request 502 into an EC message 506 using the EC code 504. The EC code 504 is a forward error correction (FEC) code under the assumption of bit erasures. The EC code 504 transforms the original transaction request 502 into a longer EC message 506 such that the original transaction request 502 can be recovered from a portion or a fragment of the EC message 506.

In some implementations of the present specification, the EC code 504 is a near-optimal erasure code, such as, a Tornado code or a low-density parity-check code. In alternative implementations of the present specification, the EC code 504 is a near optimal fountain code, such as, a fountain code, an online code, a Luby transform (LT) code, or a raptor code. In alternative implementations of the present specification, the EC code 504 is an optimal erasure code, such as, a parity code, a Parchive code, a Reed-Solomon code, or a regenerating code. In some implementations of the present specification, the EC code 504 can be any suitable type of erasure code.

Figure 5:
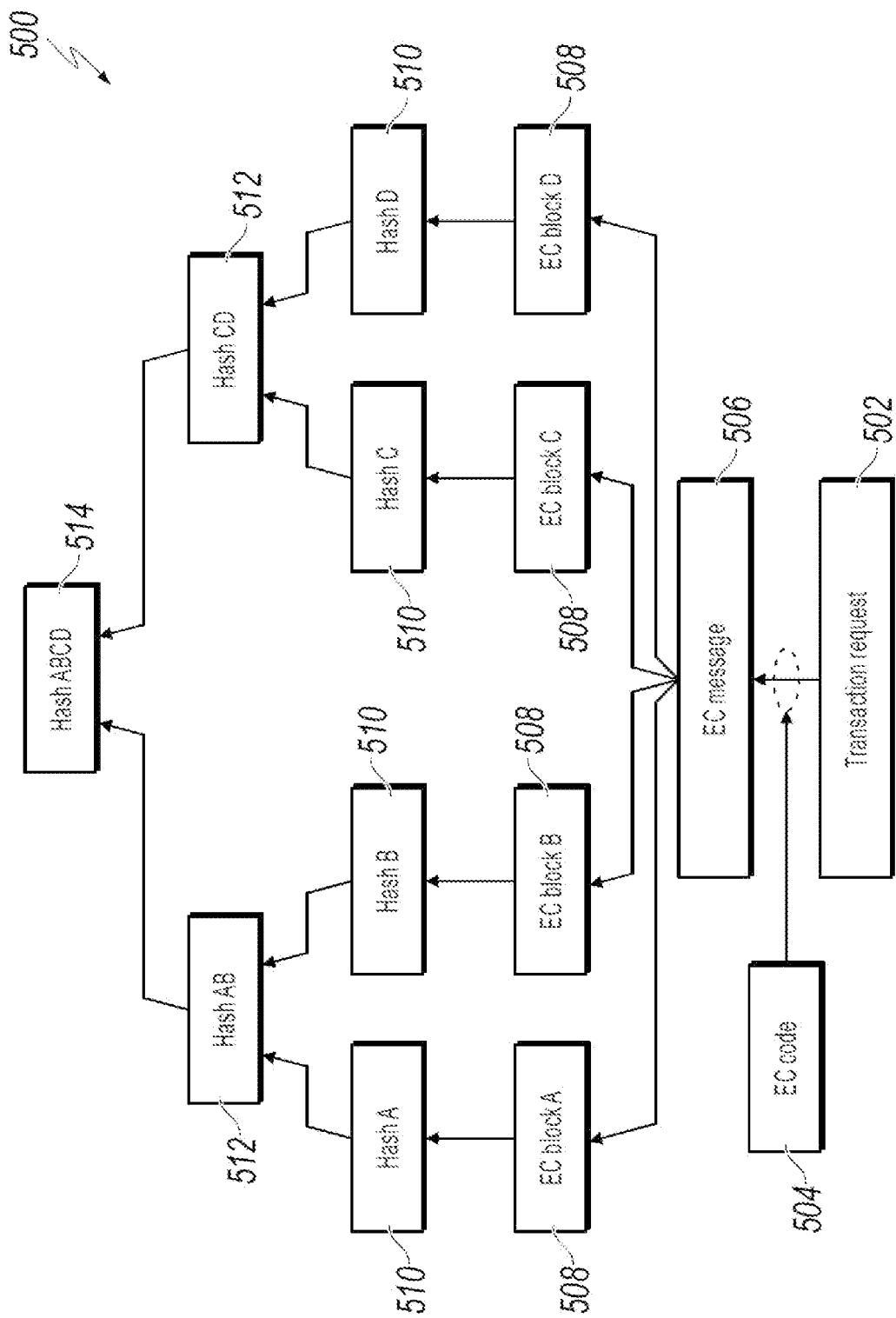
FIG. 5 depicts an example of a hash tree in accordance with implementations of the present specification.

After transforming the transaction request 502 into the EC message 506, the primary node 404 generates a number of EC blocks 508 using the EC message 506. For example, as illustrated in FIG. 5, the primary node 404 generates four EC blocks 508, EC block A, EC block B, EC block C, and EC block D by dividing the EC message 506. Note that the EC blocks 508 are illustrated in FIG. 5 as including four blocks for illustrative purpose, the EC blocks 508 may be generated as including any suitable number of EC blocks 508. The EC blocks 508 will be sent to the respective backup nodes 406 within the INITIAL messages.

In some implementations of the present specification, the EC blocks 508 have a same size. However, in alternative implementations, the EC blocks 508 may have sizes that are different from each other.

In some implementations of the present specification, the primary node 404 generates a hash tree 500 (e.g., a Merkle tree) using the EC blocks 508. The hash tree 500 includes a number of leaf node that are labeled with the hash of data blocks and a number of non-leaf nodes that are labeled with the cryptographic hash of the labels of its child nodes. For example, as illustrated in FIG. 5, the hash tree 500 is configured as including four leaf nodes 510, hash A, hash B, hash C, and hash D that are generated as a cryptographic hash of their respective EC blocks 508, four non-leaf nodes 512 that are generated as a hash of the concatenation of their respective child nodes 510, and a non-leaf node 514 that is generated as a hash of its child nodes 512 and is a root hash of the hash tree 500.

Hash trees 500 allow efficient and secure verification of the contents of large data structures. Hash trees 500 can be used to verify any kind of data stored, handled, and transferred in and between computers. They can help ensure that data blocks received from other peers in a P2P network are received undamaged and unaltered, and even to check that the other peers do not send fake blocks. Verification of data blocks using the hash tree 500 will be discussed below in greater detail with reference to the following steps of the consensus process 400.

Referring back to FIG. 4, the primary node 404 generate a first message (e.g., an INITIAL message) after generating the EC blocks 508 and the hash tree 500. The first message indicates that the primary node is initiating a consensus process. In some implementations, the INITIAL message, as an example of the first message, is generated using the information in the EC blocks 508 and the hash tree 500. In some implementations of the present specification, referring to FIG. 6, the INITIAL message has a format of <epoch, tx_root_hash, ec_block_hash, ec_block, seq, j>, where "epoch" represents a round of consensus in which the message is being sent, "tx_root_hash" represents the root hash 514 in the hash tree 500, "ec_block_hash" represents the hashes 510 and/or 512 in the hash tree 500, "ec_block" represents the EC blocks 508 in the hash tree 500, "seq" represents the sequence number associated with the transaction request 502, and "j" represents the network node that generates and sends the INITIAL message. In some implementations, the INITIAL message can have a different format, for example, by including additional or different fields.

Referring back to FIG. 4, at 416, in the first phase of the consensus process, the primary node 404 multicasts the INITIAL message to the other network nodes (e.g., backup nodes 406). In some implementations, the INITIAL messages that are sent to the backup nodes 406 have a format of <epoch, tx_root_hash, ec_block_hash, ec_block, seq, j>. For example, the primary node 404 may send a first INITIAL message <epoch 1, Hash ABCD, {Hash B, Hash C, Hash D}, EC block A, 1, 0> to a first backup node 406, and a second INITIAL message <epoch 1, Hash ABCD, {Hash A, Hash C, Hash D}, EC block B, 1, 0> to a second backup node 406, and so on. Note that the information in the INITIAL message, such as "ec_block" can be used with "ec_block_hash" to reconstructing the hash tree 500. For example, in the first INITIAL message <epoch 1, Hash ABCD, {Hash B, Hash C, Hash D}, EC block A, 1, 0>, the EC block 508 "EC block A" can be hashed to generate a cryptographic hash 510 "Hash A," which is further used with the other hashes 510 "{Hash B, Hash C, Hash D}" to reconstruct the hash tree 500. The reconstructed hash tree 500 will be used to verify the ECHO messages as discussed below in greater details with reference to the following steps of the consensus process.

At 418, each of the backup nodes 406 generates a second message (e.g., an ECHO message) in the second phase of the consensus process after receiving the INITIAL message from the primary node 404. The second message indicates that the backup node has received the first message from the primary node. The second message is sent as a reply in response to the first message. In some implementations of the present specification, the ECHO message is generated by a backup node 406 as including the INITIAL message or a part of the INITIAL message and a signature of the backup node 406 associated with the INITIAL message. For example, the backup node 406 may generate the signature by signing the INITIAL message or a digest of the INITIAL message using a private key. The private-key signature may be used by other network nodes using a public key paired with the private key to authenticate the ECHO message that includes the private-key signature.

In some implementations of the present specification, referring to FIG. 6, the ECHO message has a format of <epoch, tx_root_hash, ec_block_hash, ec_block, seq, sign_proof, j>, where "epoch" represents a round of consensus in which the message is being sent, "tx_root_hash" represents the root hash 514 in the hash tree 500, "ec_block_ hash" represents the hashes 510 and/or 512 in the hash tree 500, "ec_block" represents the EC blocks 508 in the hash tree 500 that are received by the respective backup nodes 406, "seq" represents the sequence number associated with the transaction request 502, "sign-proof" represents the signature of the backup nodes 406 associated with the INITIAL messages, and "j" represents the network node that generates and sends the ECHO message. In some implementations, the ECHO message can have a different format, for example, by including additional or different fields.

Referring back to FIG. 4, at 420, the backup nodes 406 send the ECHO messages to the primary node 404. At 421, each of the backup nodes 406 sends the ECHO messages to the other backup nodes 406. At 423, each of the backup nodes 406 may receive the ECHO messages from the other backup nodes 406.

At 422, the primary node 404 verifies the ECHO messages that are sent by the backup nodes 406. In some implementations of the present specification, the primary node 404 verifies whether the ECHO messages are valid according to the hash tree 500. For example, the primary node 404 may receive a first ECHO message <epoch 1, Hash ABCD, {Hash B, Hash C, Hash D}, EC block A, 1, 1> from a first backup node 406. The primary node 404 can retrieve EC block 508 "EC block A" from the message and hash it to generate a cryptographic hash 510 "Hash A." The primary node 404 further use the generated hash 510 "Hash A" with the other hashes 510 "{Hash B, Hash C, Hash D}" in the message to reconstruct the hash tree 500. Then, the primary node 404 determines the root hash 514 of the reconstructed hash tree 500 and compares it with the root hash 514 in the ECHO message, such as, "Hash ABCD." If the two root hashes 514 match, the primary node 404 determines that the ECHO message is valid. The primary node 404 may store the valid ECHO messages and discard the ECHO messages that are determined to be invalid.

At 424, the primary node 404 determines whether a number of the valid ECHO messages exceeds a pre-determined threshold. In some implementations of the present specification, the primary node 404 determine whether the number of the valid ECHO messages reaches a quorum number n−f or 2f+1, where n is the total number of the network nodes and f is the maximum number of the faulty nodes that the network can tolerate.

At 426, the primary node 404 reconstructs the transaction request 502 in response to determining that the number of the valid ECHO messages reaches the quorum number. In some implementations of the present specification, the primary node 404 reconstructs the transaction request 502 based on at least a subset of valid ECHO messages according the EC code. For example, the primary node 404 may retrieve a number of n−2f or f+1 of the EC blocks 508 that are in the quorum number (e.g., n−f or 2f+1) of valid ECHO messages, and use the retrieved EC blocks 508 to reconstructed the transaction request 502 according to the EC code 504.

At 428, in the third phase of the consensus process, the primary node 404 generates a third message (e.g., an ACCPET message) in response to determining that the transaction request 502 has been successfully reconstructed. The third message indicates that a network node has accepted a predetermined number of the second messages. In some implementations, the third message can indicate the network node is ready to execute the transaction. In some implementations, the third message can indicate that the transaction has been successfully reconstructed at the network node. For example, the ACCPET message can be used to indicate to other network nodes that the transaction request 502 has been successfully reconstructed. If the primary node 404 fails to reconstructed the transaction request 502, the primary node 404 may not generate the ACCEPT message.

In some implementations of the present specification, referring to FIG. 6, the ACCEPT message has a format of <epoch, tx_root_hash, seq, sign_proofs, j>, where "epoch" represents a round of consensus in which the message is being sent, "tx_root_hash" represents the root hash 514 in the hash tree 500, "seq" represents the sequence number associated with the transaction request 502, "sign-proofs" represents a set of the signatures in the valid ECHO messages, and "j" represents the network node that generates and sends the ACCEPT message. In some implementations, the ACCEPT message can have a different format, for example, by including additional or different fields.

Referring back to FIG. 4, at 430, the primary node 404 sends the ACCPET message to the backup nodes 406.

Similar to the primary node 404, each of the backup nodes 406 can reconstruct the transaction request, for example, by performing similar steps to the steps 422-428 as the primary node 404. At 432, each of the backup nodes 406 generates an ACCEPT message in response to determining that the transaction request 502 has been successfully reconstructed by the backup node 406. In some implementations, the primary node 404 and the backup node 406 may perform steps 422-428 in a parallel manner, for example, as indicated in FIG. 3.

At 434, the backup nodes 406 send the ACCEPT messages to the primary node 404. Meanwhile each of the backup nodes 406 may send the ACCEPT messages to the other backup nodes 406.

At 436, the primary node 404 executes the transaction request 502 in response to determining that a number of the ACCEPT messages exceeds a pre-determined threshold. In some implementations of the present specification, the primary node 404 determines whether the received ACCEPT messages are identical and whether a number of the ACCEPT messages that are identical reaches a quorum number (e.g., 2f+1). If the number of the identical ACCEPT messages reaches the quorum number, the primary node 404 determines that a consensus has been achieved among all the network nodes and then executes the transaction request 502 locally. In some implementations of the present specification, if the primary node 404 determines the number of the ACCEPT messages that are identical does not reach the quorum number, the primary node 404 determines that a consensus has not been achieved among all the network nodes, and then refrains from executing the transaction request 502.

In some implementations of the present specification, each of the backup nodes 406 may perform the same operations that is performed by the primary node 404 as described above at 436 before executing the transaction request 502. If a backup node 406 determines that the ACCEPT messages it receives exceeds a pre-determined threshold, the backup node 406 determines a consensus has been achieved among the network nodes and executes the transaction request 502 locally. In some implementations of the present specification, if the backup node 406 determines the number of the ACCEPT messages that are identical does not reach the quorum number, the backup node 406 determines that a consensus has not been achieved among all the network nodes, and then refrains from executing the transaction request 502.

At 438, the primary node 404 sends a transaction result to the client node 402 after executing the transaction request 502. The backup nodes 406 that have successfully executed the transaction request 502 locally may also send their respective transaction results to the client node 402.

The consensus process as discussed above includes many features that improve the operation of the entire blockchain system and help alleviate the network bottleneck. For example, the consensus process in the present specification includes generating a number of EC blocks according to an EC code using a transaction request and send one of the EC blocks to each of the network nodes. The EC block is smaller in size than the original transaction request. Therefore, sending the EC block instead of the transaction request to the network nodes reduces the size of data blocks that are transmitted among the network nodes of the blockchain network, thereby conserving the network bandwidth and reducing the network load. This further reduces the size of data that are written to and read from the memory space of the network nodes, thereby reducing a burden on the memory space of the network nodes and improving the efficiency of the overall blockchain system.

During the consensus process, the backup nodes are waiting for a request from the primary node. However, the primary node may encounter a *Byzantine* failure or a crash failure so that the primary node cannot broadcast the request within a predetermined time window. When a specific amount of time has passed without the primary node multicasting the request, a new primary node may need to be chosen to prevent the backup nodes from waiting indefinitely for requests to execute.

Figure 7:
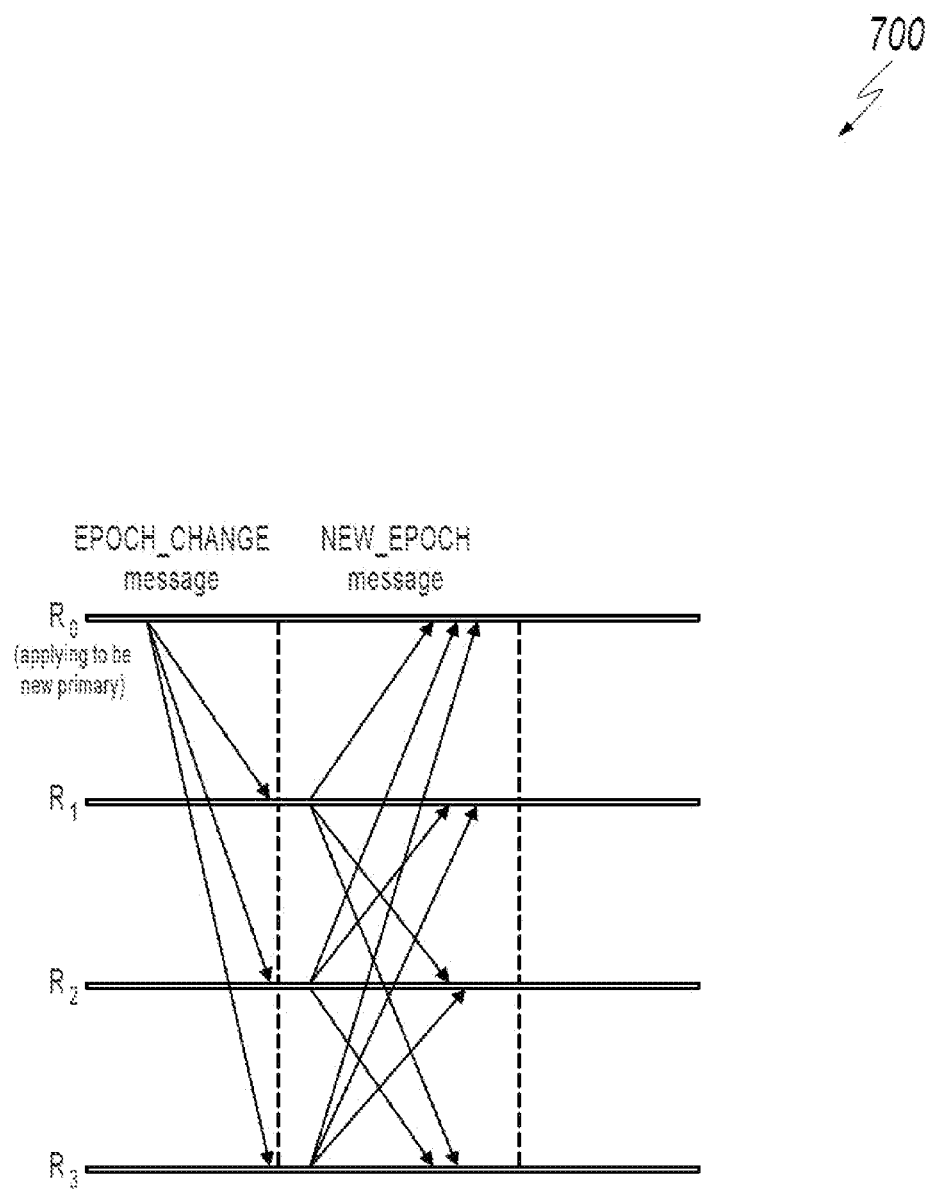
FIG. 7 depicts an example of a process of performing a change of a primary node in a distributed system in accordance with implementations of the present specification.

FIG. 7 depicts an example of a process 700 for performing a change of a primary node (e.g., node 214 or 404) of a distributed system (e.g., blockchain network 102 and 212) that can be executed in accordance with implementations of the present specification. Specifically, FIG. 7 illustrates a diagram presenting an exemplary embodiment of a method 700 of performing a change of a primary node, according to the present specification. In some implementations, a primary node is associated with an epoch that includes a consensus process with the primary node being the leader. A change of a primary node can result in a change of epoch.

In some implementations, in response to determining that a primary node of a current epoch needs to be changes, a backup node of the blockchain network sends a first message to the other network nodes. The first message indicates that the backup node would like to be a new primary node in a new epoch. For example, as illustrated in FIG. 7, the backup node $R_0$ sends an EPOCH_CHANGE message to the other networks nodes $R_1$, $R_2$, and $R_3$ in the blockchain network in response to that the backup node $R_0$ determines that a current primary node is faulty and that an epoch change needs to be performed. The EPOCH_CHANGE message is an example of the first message indicating that the backup node $R_0$ applies to be the new primary node. The epoch change can cause a change from a current epoch with a current primary node to a new epoch with a new primary node. Note that process 700 is illustrated as implemented in conjunction with four network nodes for illustrative purposes only. Process 700 may be implemented in conjunction with any suitable number of network nodes.

Then, each of the network nodes receives the first message that is sent by the backup node, prepares a second message in response to the first message, and multicasts the second message to the other network nodes. For example, as illustrated in FIG. 7, the network node $R_1$ receives the EPOCH_CHANGE message that is sent by the backup node $R_0$, and replies to the backup node $R_0$ with a NEW_EPOCH message indicating an acknowledgement that the backup node $R_0$ may become the new primary node. Meanwhile, the network node $R_1$ also multicasts the NEW_EPOCH message to the other network nodes, such as, network nodes $R_2$ and $R_3$. Similarly, network node $R_2$ and $R_3$ each multicasts a NEW_EPOCH message to the other network nodes.

The epoch change process as discussed above, a format of the EPOCH_CHANGE message, and a format of the NEW_EPOCH message will be discussed below in greater detail with reference to FIGS. 8-9.

Figure 8:
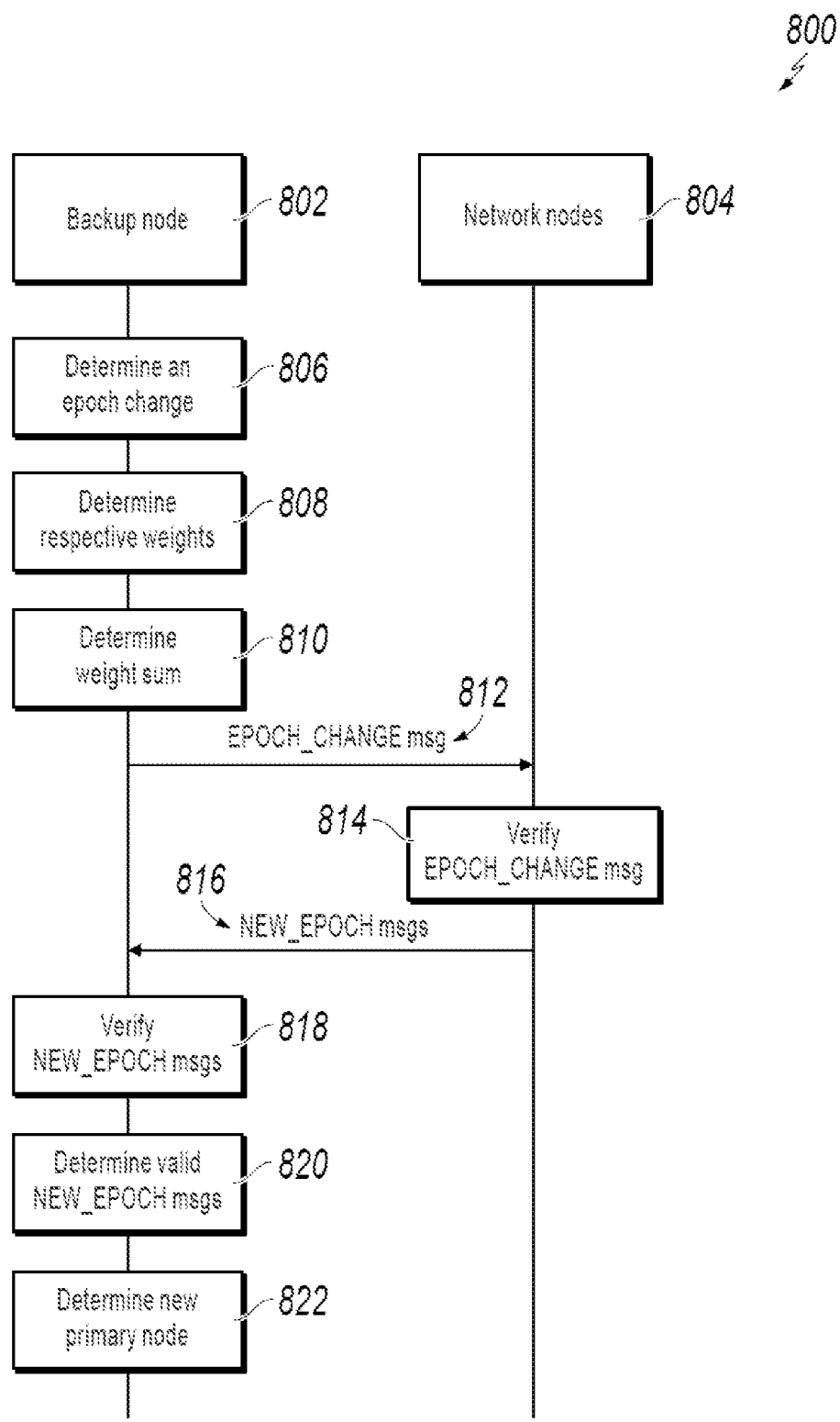
FIG. 8 depicts an example of a process of performing a change of a primary node in a distributed system in accordance with implementations of the present specification.

FIG. 8 depicts an example of a process 800 for performing a change of a primary node in a distribute system (e.g., blockchain network 102 or 212) that can be executed in accordance with implementations of the present specification. In some implementations, the example process 800 may be performed using one or more computer-executable programs executed using one or more computing devices. For clarity of presentation, the description that follows generally describes method 800 in the context of the other figures in this description. It will be understood that method 800 may be performed, for example, by any suitable system, environment, software, and hardware, or a combination of systems, environments, software, and hardware, as appropriate. In some implementations, various steps of method 800 can be run in parallel, in combination, in loops, or in any order.

Process 800 starts at 806 where a backup node 802 determines that an epoch change needs to be performed. The epoch change discussed herein causes a change from a current epoch with a current primary node to a new epoch with a new primary node. An example epoch can includes a consensus process (e.g., consensus process 300 or 400) for achieving consensus among a number of network nodes using a primary node as discussed above with reference to FIGS. 3-6.

In some implementations of the present specification, the backup node 802 determines that an epoch change needs to be performed in response to determining that the backup node 802 is still waiting for a request from the current primary node after a specific amount of time has passed without receiving the request from the current primary node. For example, the current primary node may encounter a *Byzantine* failure or a crash failure so that the current primary node cannot multicast the request within a predetermined time window. Therefore, the epoch change is triggered by timeouts that prevent backup nodes from waiting indefinitely for requests to execute. The epoch change process discussed herein provides liveness and reduces network latency by allowing the system to make progress when the primary node fails.

At 808, the backup node 802 determines a respective weight of the backup node 802 associated with each of phases of the consensus process in the current epoch. In some implementations, the consensus process includes three phases as described above with reference to FIGS. 3-6. The weight is a metric of a qualification of the backup node 802 to be the new primary node in a new epoch.

In some implementations of the present specification, the backup node 802 determines a weight of the backup node 802 for a first phase of the consensus process in the current epoch to be a first value. For example, the backup node 802 may be assigned an initial weight of 10% if the backup node 802 has entered a first phase of the consensus process (e.g., the first phase 310 of the consensus process 300). In alternative implementations of the present specification, the backup node 802 may assign any suitable weight value to the backup node 802 for the first phase of the current consensus process.

In some implementations of the present specification, the backup node 802 determines a weight of the backup node 802 for a second phase of the consensus process (e.g., second phase 320 of the consensus process 300) in the current epoch based on a quorum verification process. The quorum verification process is performed by determining whether the backup node 802 receives a predetermined number (e.g., 2f+1) of ECHO messages from the other network nodes in the second phase of the consensus process.

In some implementations of the present specification, if the backup node 802 fails the quorum verification (e.g., the backup node 802 receives a number of ECHO messages that is lower than a predetermined threshold), the backup node 802 may determine the weight of the backup node 802 for the second phase of the consensus process to be a first value. If the backup node 802 passes the quorum verification (e.g., the backup node 802 receives a number of ECHO messages that equals to or exceeds a predetermined threshold), the backup node 802 may determine the weight of the backup node 802 for the second phase of the consensus process to be a second value. In some implementations of the present specification, the second value is determines as larger than the first value. For example, if the backup node 802 fails the quorum verification, the backup node 802 can be assigned a weight value of zero for the second phase of the consensus process. If the backup node 802 passes the quorum verification, the backup node 802 can be assigned a weight value of 45% to the backup node 802 for the second phase of the consensus process. However, in alternative implementations of the present specification, the backup node 802 may assign any suitable value to the backup node 802 for the second phase of the consensus process in the current epoch.

In some implementations of the present specification, the quorum verification further includes verifying whether the ECHO messages that the backup node 802 receives from the other network nodes during the second phase of the consensus process are valid. For example, the backup node 802 may authenticate the private key signatures in the ECHO messages using a public key to determine whether the ECHO messages are valid.

Similar to determining the weight for the second phase, in some implementations, the backup node 802 determines a weight of the backup node 802 for a third phase of the consensus process (e.g., the third phase 330 of the consensus process 300) in the current epoch based on a quorum verification process. The quorum verification process is performed by determining whether the backup node 802 receives a predetermined number (e.g., 2f+1) of accept messages from the other network nodes in the third phase of the consensus process in the current epoch. Each of the accept messages from other network nodes indicates that each of the other network nodes has accepted a predetermined number of ECHO messages. The accept message can be, for example, the ACCEPT messages described above with reference to the third phase 330 of the consensus process 300.

In some implementations of the present specification, if the backup node 802 fails the quorum verification (e.g., the backup node 802 receives a number of ACCEPT messages that is lower than a predetermined threshold), the backup node 802 may determine the weight of the backup node 802 for the third phase of the consensus process to be a first value. If the backup node 802 passes the quorum verification (e.g., the backup node 802 receives a number of ACCEPT messages that equals to or exceeds a predetermined threshold), the backup node 802 may determine the weight of the backup node 802 for the third phase of the consensus process to be a second value. In some implementations, the second value is determines as larger than the first value. For example, if the backup node 802 fails the quorum verification, the backup node 802 can be assigned a weight value of zero to the backup node 802 for the third phase of the consensus process. If the backup node 802 passes the quorum verification, the backup node 802 can be assigned a weight value of 45% to the backup node 802 for the third phase of the consensus process. However, in alternative implementations of the present specification, the backup node 802 may assign any suitable value to the backup node 802 for the third phase of the consensus process in the current epoch.

At 810, after determining the respective weights of the backup node 802 for the phases of the consensus process in the current epoch, the backup node 802 determines a weight sum of the backup node 802 for the consensus process based on the respective weights. In some implementations of the present specification, the weight sum is a sum of the respective sums of the backup nodes associated with each of the phases of the consensus process in the current epoch. For example, if the backup node 802 has determined a first weight value of the backup node 802 for the first phase to be 10%, a second weight value of the backup node 802 for the second phase to be 45%, and a third weight value of the backup node 802 for the third phase to be 45%, the backup node 802 determines the weight sum to be 100%. As another example, if the backup node 802 has determined a first weight value of the backup node 802 for the first phase to be 10%, a second weight value of the backup node 802 for the second phase to be 45%, and a third weight value of the backup node 802 for the third phase to be 0, the backup node 802 determines the weight sum to be 55%.

At 812, the backup node 802 sends an EPOCH_CHANGE message to the other network nodes 804 if the backup node 802 determines that the weight sum that was determined at 810 reaches or exceeds a predetermined threshold. For example, the backup node 802 may send an EPOCH_CHANGE message to the other network nodes 804 if the weight sum as determined at 810 reaches 100%. The EPOCH_CHANGE message indicates a request for a change from the current epoch with the current primary node to the new epoch with the backup node being the new primary node.

In some implementations of the present specification, referring to FIG. 9, the EPOCH_CHANGE message has a format of <weight, epoch+1, ECHO{ }, ACCEPT{ }, j>, where "weight" represents the weight sum of the backup node 802 as determined previously at 810 for the consensus process, "epoch+1" represents a round of new consensus (i.e., a new epoch) associated with a new primary node, "ECHO{ }" represents a set of ECHO messages the backup node 802 receives during the second phase of the consensus process, "ACCEPT{ }" represents a set of ACCEPT messages the backup node 802 receives during the third phase of the consensus process, and "j" represents the network node (e.g., backup node 802) that generates and sends the EPOCH_CHANGE message. In some implementations, the EPOCH_CHANGE message can have a different format, for example, by including additional or different fields.

Referring back to FIG. 8, at 814, the network nodes 804 other than the backup node 802 verify the EPOCH_CHANGE message that is sent by the backup node 802. In some implementations, each of the network nodes 804 verifies whether the EPOCH_CHANGE message is valid by verifying whether the weight sum in the EPOCH_CHANGE message is valid. In some implementations, verifying whether the weight sum in the EPOCH_CHANGE message is valid includes verifying whether the set of signatures in the ECHO messages included in the EPOCH_CHANGE message are valid. For example, each of the network nodes 804 may authenticate the set of private key signatures in the ECHO messages included the EPOCH_CHANGE message using a public key.

At 816, each of the network nodes 804 sends a NEW_EPOCH message to the backup node 802 in response to verifying that the EPOCH_CHANGE message sent by the backup node 802 is valid. The NEW_EPOCH message indicates an acknowledgement of the backup node to be the new primary node. For example, the NEW_EPOCH message sent by a network node 804 includes an indication that the network node 804 acknowledges that the backup node 802 will become the new primary node in the new epoch. Meanwhile, each of the network nodes 804 also sends the NEW_EPOCH message to the other network nodes 804.

Referring to FIG. 9, the NEW_EPOCH message is generating as having a format of <epoch+1, i, j, seq, ec_digest>, where ""epoch+1" represents a round of new consensus (i.e., a new epoch) associated with a new primary node, "i" represents the new primary node in the new epoch, "j" represents a network node 804 that sends the NEW_EPOCH message, and "ec_digest" represents a digest of the EPOCH_ CHANGE message. In some implementations, the digest of the EPOCH_CHANGE message includes a hash value of the EPOCH_CHANGE message. In some implementations, the NEW_EPOCH message can have a different format, for example, by including additional or different fields.

Referring back to FIG. 8, at 818, the backup node 802 verifies that whether the NEW_EPOCH messages that are sent by the network nodes 804 are valid. In some implementations, the backup node 802 verifies the NEW_EPOCH messages by verifying whether the digest of the EPOCH_ CHANGE message in the NEW_EPOCH messages is valid. Because the digest includes information of the EPOCH_ CHANGE message, the digest also includes the signatures in the EPOCH_CHANGE message. The backup node 802 can verify the digest of the EPOCH_CHANGE message by verifying whether the set of signatures in the EPOCH_ CHANGE message are valid.

At 820, the backup node 802 determines whether a number of valid NEW_EPOCH message as determined at 818 exceeds a predetermined threshold. In some implementations, the predetermined threshold is a quorum number (e.g., 2f+1).

At 822, the backup node 802 determines the backup node 802 to be the new primary node in the new epoch in response to determining that the number of valid NEW_EPOCH message as determined exceeds the predetermined threshold. Note that each of the network nodes 804 performs the same steps 818-822 as the backup node 802 does, and the network nodes 804 and the backup node 802 may perform steps 818-822 in a parallel manner. For example, each of the network nodes 804 may verify a set of NEW_EPOCH message that are sent from the other network nodes 804, determine whether a number of valid NEW_EPOCH messages exceeds a predetermined threshold, and determines a new primary node.

The epoch change process (e.g., process 700 or 800) as discussed above includes many features that improve the operation of the entire blockchain system and help alleviate the network bottleneck. For example, the epoch change process in the present specification includes assigning respective weights to the three phases of the consensus process, determining a weight sum based on the respective weights of the three phases, and determines a new primary node based on the weight sum. The epoch change process based on the weigh sum instead of a round robin method can facilitate choosing a new primary node that is non-faulty in a timely manner. A round robin method may cause a frequent change of primary node when multiple network nodes in line for the new primary node are faulty. This significantly affects the blockchain service by introducing latency or delay in finding a primary node that is non-faulty. Unlike the round robin method, the epoch change process in the present specification relies on the weight sum to select the new primary node, which can reduce the time in finding the new primary node that is not faulty. This can further improve the efficiency of the overall blockchain system in providing the blockchain services.

During the operation of a blockchain network, the execution speed of some network nodes may lag behind that of most network nodes due to network jittering, sudden power failure, disc failure and the like. In this scenario, more than ⅓ of the network nodes in the system may fail. BFT provides safety and liveness if less than ⅓ of the network nodes fail during the life time of the system. However, these guarantees are insufficient for long-lived systems because the upper bound is likely to be exceeded in the scenario as described above. Therefore, a recovery process is desirable that makes faulty network nodes behave correctly again and continues to participate in subsequent consensus processes to allow the system to tolerate more than f faults over its lifetime. Moreover, the described recovery process can recover one or more networks nodes that are still performing a consensus process (e.g., the consensus process 300 or 400), and do not need to wait until the consensus is reached among all the network nodes. As such, the described recovery process can further reduce the system latency and improve efficiency of the blockchain network.

Figure 10:
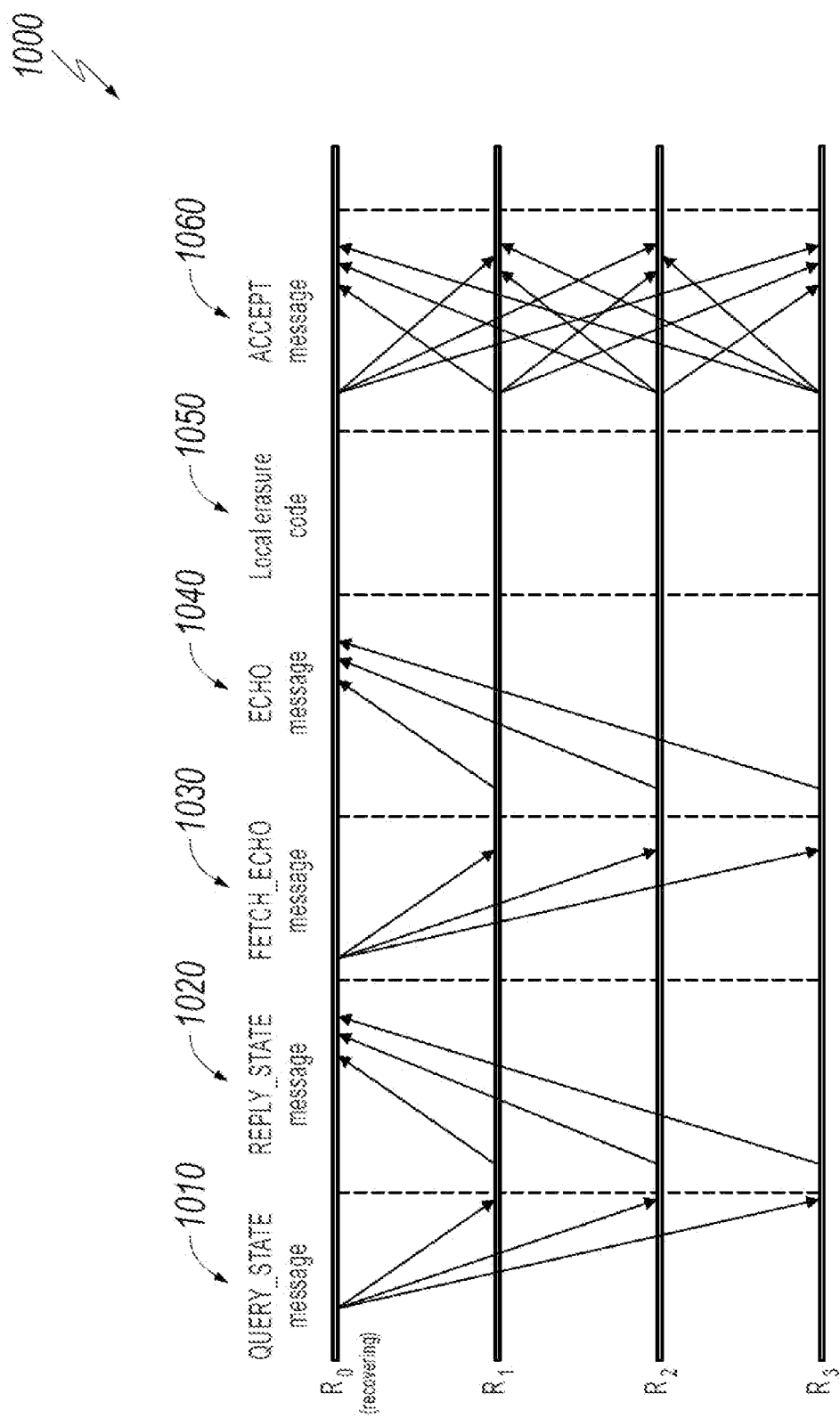
FIG. 10 depicts an example of a process of performing a recovery process of a network node in a distributed system in accordance with implementations of the present specification.

FIG. 10 depicts an example of a process 1000 for performing a recovery process of a network node (e.g., node 214 or 404) of a distributed system (e.g., blockchain network 102 and 212) that can be executed in accordance with implementations of the present specification. Specifically, FIG. 10 illustrates a diagram presenting an exemplary embodiment of a method 1000 of performing a recovery process of a network node, according to the present specification. As illustrated in FIG. 10, the process 1000 includes a few phases and stages.

In a first phase 1010, a network node (e.g., network node $R_0$) that would like to recover a target transaction with a target sequence number $R_0$ multicasts a state request message (e.g., QUERY STATE message) to the other network nodes indicating that the network node is to be recovered. The state request message can includes the target sequence number that the network node $R_0$ would like to recover. In a second phase 1020, the other network nodes receive the state request message and send a state reply message (e.g., REPLY STATE message) to the network node $R_0$. In a third phase 1030, the network node $R_0$ sends a requesting message (e.g., FETCH ECHO message) to the other network nodes requesting an ECHO message from each of the other network nodes. The ECHO message can be the same ECHO message sent by the respective other network nodes in the second phase 320 of the consensus process 300 as described above with reference to FIGS. 3-6. In a fourth phase 1040, each of the other network nodes sends an ECHO message to the network node $R_0$ in response to the FETCH ECHO message. In a fifth phase 1050, the network node $R_0$ verifies the ECHO messages and recovers the target transaction according to an EC code, for example, according to the example reconstruction techniques as described above with reference to FIG. 4. In a sixth phase 1060, the network node $R_0$ sends an ACCEPT message to the other network nodes indicating that the network node has been recovered.

Note that process 1000 is illustrated as implemented in conjunction with four network nodes for illustrative purposes only. The process 1000 may be implemented in conjunction with any suitable number of network nodes. The process 1000, a format of the QUERY STATE message, and a format of the REPLY STATE message will be discussed below in greater detail with reference to FIGS. 11-12.

Figure 11:
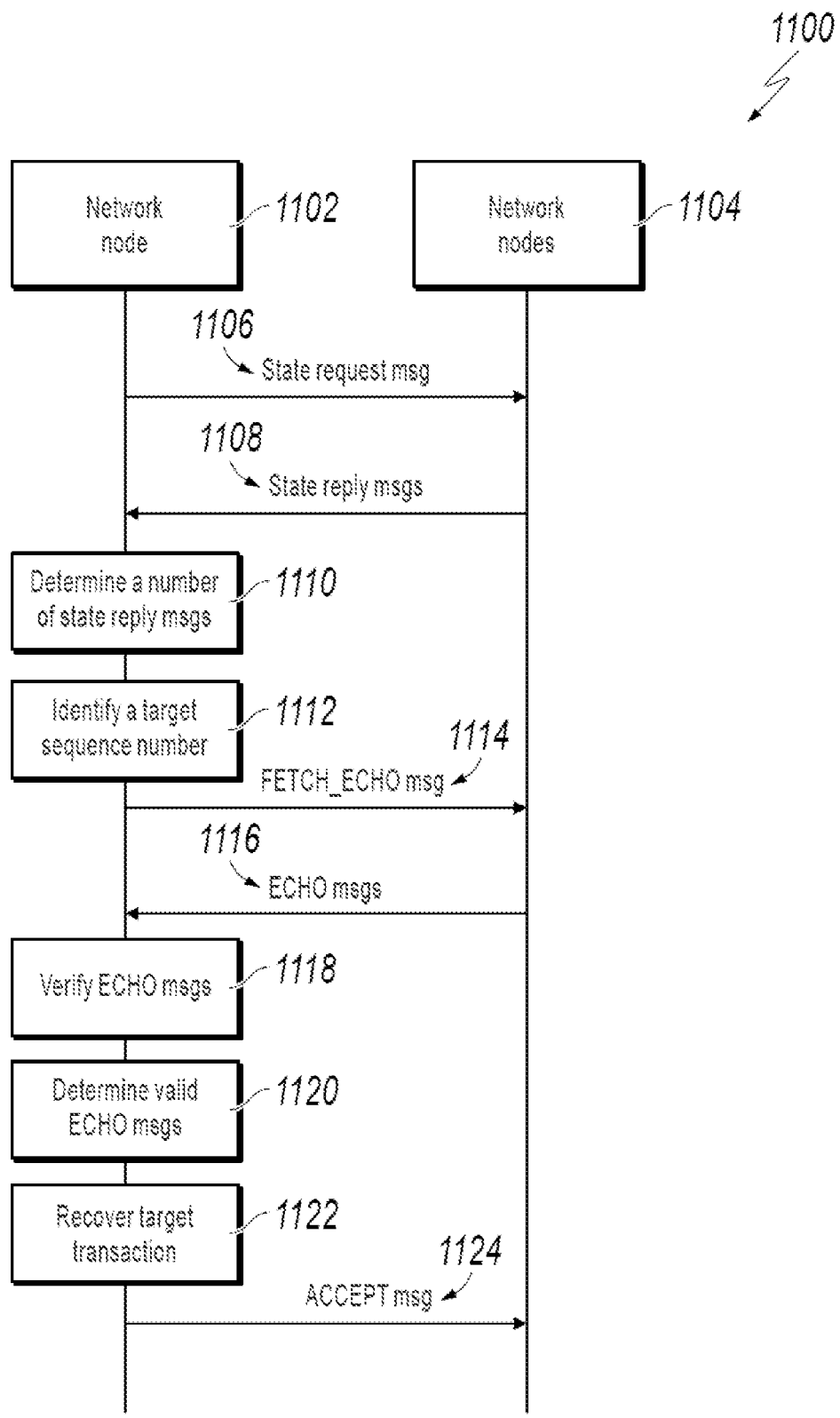
FIG. 11 depicts an example of a process of performing a recovery process of a network node in a distributed system in accordance with implementations of the present specification.

FIG. 11 depicts an example of a process 1100 for performing a recovery process of a network node in a distribute system (e.g., blockchain network 102 or 212) that can be executed in accordance with implementations of the present specification. In some implementations, the process 1100 may be performed using one or more computer-executable programs executed using one or more computing devices. For clarity of presentation, the description that follows generally describes method 1100 in the context of the other figures in this description. It will be understood that method 1100 may be performed, for example, by any suitable system, environment, software, and hardware, or a combination of systems, environments, software, and hardware, as appropriate. In some implementations, various steps of method 1100 can be run in parallel, in combination, in loops, or in any order.

Process 1100 starts at 1106 where a network node 1102 multicasts a state request message to the other network nodes 1104. The state request message includes an indication that the network node 1102 is to recover a target transaction with a target sequence number. The network node 1102 may be a primary node or a backup node.

In some implementations of the present specification, referring to FIG. 12, the QUERY_STATE message, as an example of the state request message, has a format of <j, seq>, where "j" represents a network node 1102 that sends the QUERY_STATE message, and "seq" represents a largest sequence number or a most recent sequence number for the network node 1102 in the current consensus process. In some implementations, the QUERY STATE message can have a different format, for example, by including additional or different fields.

By broadcasting the QUERY STATE message to the other network nodes 1104, the network node 1102 is requesting the other network nodes 1104 to send their most recent sequence number to the network node 1102, thereby obtaining the latest block information of the blockchain system. And by obtaining the latest block information of the entire blockchain system, the network node 1102 may be able to synchronize to the latest status of the entire system, thereby recovering itself and continuing to participate in the consensus process.

Referring back to FIG. 11, at 1108, each of the other network nodes 1104 sends a state reply message (e.g., REPLY STATE message) to the network node 1102 in response to receiving the state request message. In some implementations, the state reply message includes a previous sequence number associated with the network nodes 1104.

In some implementations, referring to FIG. 12, the REPLY STATE message, as an example of the state replay message, has a format of <j, last_seq>, where "j" represents a network node 1104 that sends the REPLY STATE message, and "last_seq" represents a previous sequence number for the network node 1104 in the current consensus process. In some implementations, the REPLY_STATE message can have a different format, for example, by including additional or different fields.

Referring back to FIG. 11, at 1110, the network node 1102 determines whether a number of the received state reply messages exceeds a predetermined threshold. For example, the network node 1102 may determine whether a number of the received REPLY_STATE messages exceeds a quorum number (e.g., 2f+1 or n−f). In some implementations, the network node 1102 further determines whether the quorum number of the received REPLY STATE messages include an identical sequence number. The quorum number of the received REPLY_STATE messages include an identical sequence number means that a majority of the network nodes 1104 agree on a common state of the entire system.

At 1112, the network node 1102 determines the target sequence number based on the identical sequence number if the network node 1102 determines that the number of the state reply messages including the identical sequence number received from the network nodes 1104 exceeds the predetermined threshold. For example, the network node 1102 may determine the target sequence number to be an increment (e.g., "last_seq+1") of the identical sequence number (e.g., "last_seq").

At 1114, the network node 1102 sends a requesting message (e.g., FETCH_ECHO message) to the other network nodes 1104. The FETCH_ECHO message is sent by the network node 1102 to request an ECHO message from each of the other network nodes 1104. As discussed above with reference to FIGS. 3-6, the ECHO message is a message transmitted by the network nodes 1104 for achieving a consensus among the network nodes 1104 on a target transaction. The ECHO message includes a part of the target transaction (e.g., an EC block) and a signature of the network node 1104 that sends the ECHO message.

In some implementations, referring to FIG. 12, the FETCH_ECHO message, as an example of the requesting message, has a format of <j, last_seq+1>, where "j" represents a network node 1102 that sends the FETCH_ECHO message, and "last_seq+1" represents a target sequence number associated with the ECHO messages that the network node 1102 is requesting from the other network nodes 1104. In some implementations, the FETCH_ECHO message can have a different format, for example, by including additional or different fields.

The FETCH_ECHO message as discussed herein is sent by the network node 1102 to request the ECHO messages including a most recent sequence number or a largest sequence number from the other network nodes 1104. By collecting the ECHO messages including a most recent sequence number or a largest sequence number from the other network nodes 1104, the network node 1102 may be able to recover to the most recent state associated with the most recent sequence number.

Referring back to FIG. 11, at 1116, each of the network nodes 1104 sends an ECHO message to the network node 1102 in response to receiving the FETCH_ECHO message. In some implementations, each of the network nodes 1104 verifies the FETCH_ECHO message before sending the ECHO message to the network node 1102. In some implementations, each of the network nodes 1104 verifies the FETCH_ECHO message by determining whether the sequence number included in the FETCH_ECHO messages exceeds a most recent sequence number associated with the network node 1104. If the sequence number included in the FETCH ECHO messages is equal to the most recent sequence number associated with the network node 1104, the network node 1104 determines that the FETCH_ECHO message is valid and that an ECHO message will be sent to the network node 1102. If the sequence number included in the FETCH ECHO messages exceeds the most recent sequence number associated with the network node 1104, the network node 1104 determines that the FETCH_ECHO message is invalid and that an ECHO message will not be sent to the network node 1102.

At 1118, the network node 1102 verifies whether the ECHO messages sent by the network nodes 1104 are valid. In some implementations, the network node 1102 verifies the ECHO messages using a Merkel tree. For example, the network node 1102 may use the data included in the ECHO message to reconstruct a Merkel tree and determine a reconstructed root hash value of the reconstructed Merkel tree. The network node 1102 may then compare the reconstructed root hash value to a root hash value included in the ECHO message. If the reconstructed root hash value matches the root hash value included in the ECHO message, the network node 1102 determines that the ECHO message is valid. If the reconstructed root hash value does not match the root hash value included in the ECHO message, the network node 1102 determines that the ECHO message is invalid and may discard the invalid ECHO message.

In some implementations, the network node 1102 verifies whether the ECHO message is valid by further verifying whether the signature in the ECHO message is valid. For example, the network node 1102 may authenticate the private key signature in the ECHO message using a public key paired with the private key to verify the signature.

At 1120, the network node 1102 determine whether a number of the valid ECHO messages received from the other network nodes 1104 exceeds a predetermined threshold. For example, the network node 1102 may determine whether a number of the valid ECHO messages received from the other network nodes 1104 exceeds a quorum number (e.g., 2f+1).

At 1122, the network node 1102 recovers the target transaction with the target sequence number in response to determining that the number of valid ECHO messages exceeds the predetermined threshold. In some implementations, the network node 1102 recovers the target transaction using the data included in the number of valid ECHO messages. For example, the network node 1102 may retrieve a subset of EC blocks included in the ECHO messages to reconstruct the target transaction according to an EC code.

At 1124, the network node 1102 multicasts an ACCEPT message to the other network nodes 1104 after recovering the target transaction. For example, the network node 1102 may multicasts an ACCEPT message to the other network nodes 1104 after successfully reconstructing the target transaction. In some implementations, the ACCEPT message includes a set of signatures in the ECHO messages and the target sequence number. By sending the ACCEPT message including the signatures and the target sequence number to the other network nodes 1104, the network node 1102 indicates to the other network nodes 1104 that the network node 1102 has recovered and synchronized to the latest state of the system.

The recovery process as discussed above in the present specification includes many features that improve the operation of the computers that implements the recovery process and helps alleviate the network bottleneck. For example, the recover process in the present specification includes operations including sending a state request message by a network node that applies to be a new primary node, receiving state reply messages from the other network nodes, and sending a FETCH_ECHO message by the network node to request ECHO messages from the other network nodes. These operations are performed such that the recovery process of the faulty network node does not interfere with the normal operation of the consensus process among the other non-faulty network nodes. This facilitates conserving computing and network resources for recovering the faulty network node by reducing the complexity of the recovery process.

Figure 13:
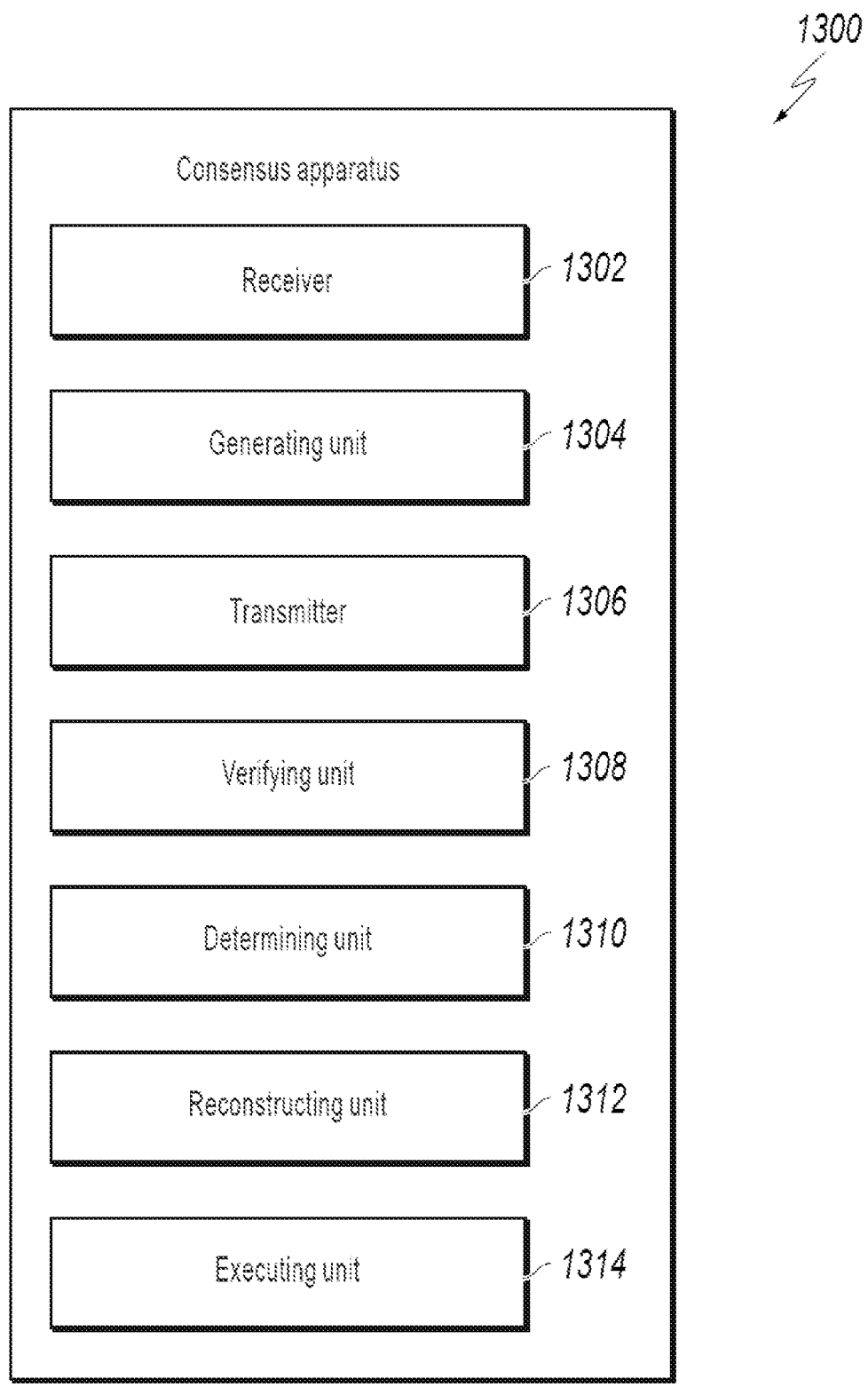
FIG. 13 depicts an example of a diagram illustrating modules of a consensus apparatus, according to an implementation of the present specification.

Referring to FIG. 13, FIG. 13 is a diagram illustrating modules of a consensus apparatus 1300, according to an implementation of the present specification. The apparatus 1300 for achieving consensus can be applied to a consensus system based on a blockchain technology. For example, the apparatus 1300 can correspond to the implementations shown in FIGS. 1-6. The apparatus 1300 can be implemented in a primary node in blockchain network. The apparatus 1300 includes the following: a receiver or receiving unit 1302, configured to receive a transaction request; a generating unit 1304, configured to generate a number of erasure code (EC) blocks according to an EC code using the transaction request; a transmitter or transmitting unit 1306, configured to send a number of first messages to the one or more backup nodes, respectively, wherein each of the number of first messages includes a composite hash value associated with the number of EC blocks; the receiver or receiving unit 1302, further configured to receive at least one second message from at least one of the backup nodes, wherein the at least one second message includes one of the number of first messages and a signature of the at least one of the backup nodes associated with the one of the number of first messages; a verifying unit 1308, configured to verify whether the at least one second message is valid in response to receiving the at least one second message from the at least one of the backup node; a determining unit 1310, configured to determine whether a number of valid second messages exceeds a pre-determined threshold; a reconstructing unit 1312, configured to reconstruct the transaction request based on a subset of the number of valid second messages according to the EC code in response to determining that the number of valid second messages exceeds the pre-determined threshold; the transmitter or the transmitting unit 1306, further configured to send a third message, to the other network nodes in response to determining that the transaction request has been successfully reconstructed, wherein the third message includes a set of signatures that are in the valid second messages; the receiver or the receiving unit 1302, further configured to receive at least one third message from at least one of the backup nodes; and an executing unit 1314, configured to execute the transaction request in response to receiving a pre-determined number of third messages that are identical.

In an optional implementation, the transaction request is associated with a sequence number.

In an optional implementation, the generating the plurality of EC blocks according to an EC code includes the following: transforming the transaction request into an EC message using the EC code and dividing the EC message into the number of EC block.

In an optional implementation, the composite hash value of the number of EC block is generated using a hash tree.

In an optional implementation, the hash tree includes a Merkle tree, and wherein the composite hash value is a root hash value of the Merkle tree.

In an optional implementation, the signature of the at least one of the backup nodes associated with the one of the number of first messages includes a private key signature of the at least one of the backup nodes associated with the one of the number of first messages.

In an optional implementation, the at least one second message further includes at least one of the number of EC blocks.

In an optional implementation, the verifying whether the at least one second message is valid includes the following: generating a reconstructed hash tree using the at least one of the number of EC blocks in the at least one second message; determining a reconstructed composite hash value of the reconstructed hash tree; and determining whether the reconstructed composite hash value matches the composite hash values in the at least one second message.

In an optional implementation, the determining unit 1310 is further configured to determine that the at least one second message is valid in response to determining that the reconstructed composite hash value matches the composite hash values in the second messages.

In an optional implementation, the pre-determined number of third messages that are identical include the pre-determined number of the third messages having an identical set of signatures.

FIG. 13 is a schematic diagram illustrating an internal functional module and a structure of a consensus apparatus 1300. An execution body in essence can be an electronic device, and the electronic device includes the following: at least one processor; and a memory configured to store an executable instruction of the at least one processor.

The at least one processor is configured to receive a transaction request; generate a number of erasure code (EC) blocks according to an EC code using the transaction request; send a number of first messages to the one or more backup nodes, respectively, wherein each of the number of first messages includes a composite hash value associated with the number of EC blocks; receive at least one second message from at least one of the backup nodes, wherein the at least one second message includes one of the number of first messages and a signature of the at least one of the backup nodes associated with the one of the number of first messages; verify whether the at least one second message is valid in response to receiving the at least one second message from the at least one of the backup node; determine whether a number of valid second messages exceeds a pre-determined threshold; reconstruct the transaction request based on a subset of the number of valid second messages according to the EC code in response to determining that the number of valid second messages exceeds the pre-determined threshold; send a third message, to the other network nodes in response to determining that the transaction request has been successfully reconstructed, wherein the third message includes a set of signatures that are in the valid second messages; receive at least one third message from at least one of the backup nodes; and execute the transaction request in response to receiving a pre-determined number of third messages that are identical.

Optionally, the transaction request is associated with a sequence number.

Optionally, the generating the plurality of EC blocks according to an EC code includes the following: transforming the transaction request into an EC message using the EC code and dividing the EC message into the number of EC block.

Optionally, the composite hash value of the number of EC block is generated using a hash tree.

Optionally, the hash tree includes a Merkle tree, and wherein the composite hash value is a root hash value of the Merkle tree.

Optionally, the signature of the at least one of the backup nodes associated with the one of the number of first messages includes a private key signature of the at least one of the backup nodes associated with the one of the number of first messages.

Optionally, the at least one second message further includes at least one of the number of EC blocks.

Optionally, the verifying whether the at least one second message is valid includes the following: generating a reconstructed hash tree using the at least one of the number of EC blocks in the at least one second message; determining a reconstructed composite hash value of the reconstructed hash tree; and determining whether the reconstructed composite hash value matches the composite hash values in the at least one second message.

Optionally, the at least one processor is further configured to determine that the at least one second message is valid in response to determining that the reconstructed composite hash value matches the composite hash values in the second messages.

Optionally, the pre-determined number of third messages that are identical include the pre-determined number of the third messages having an identical set of signatures.

Figure 14:
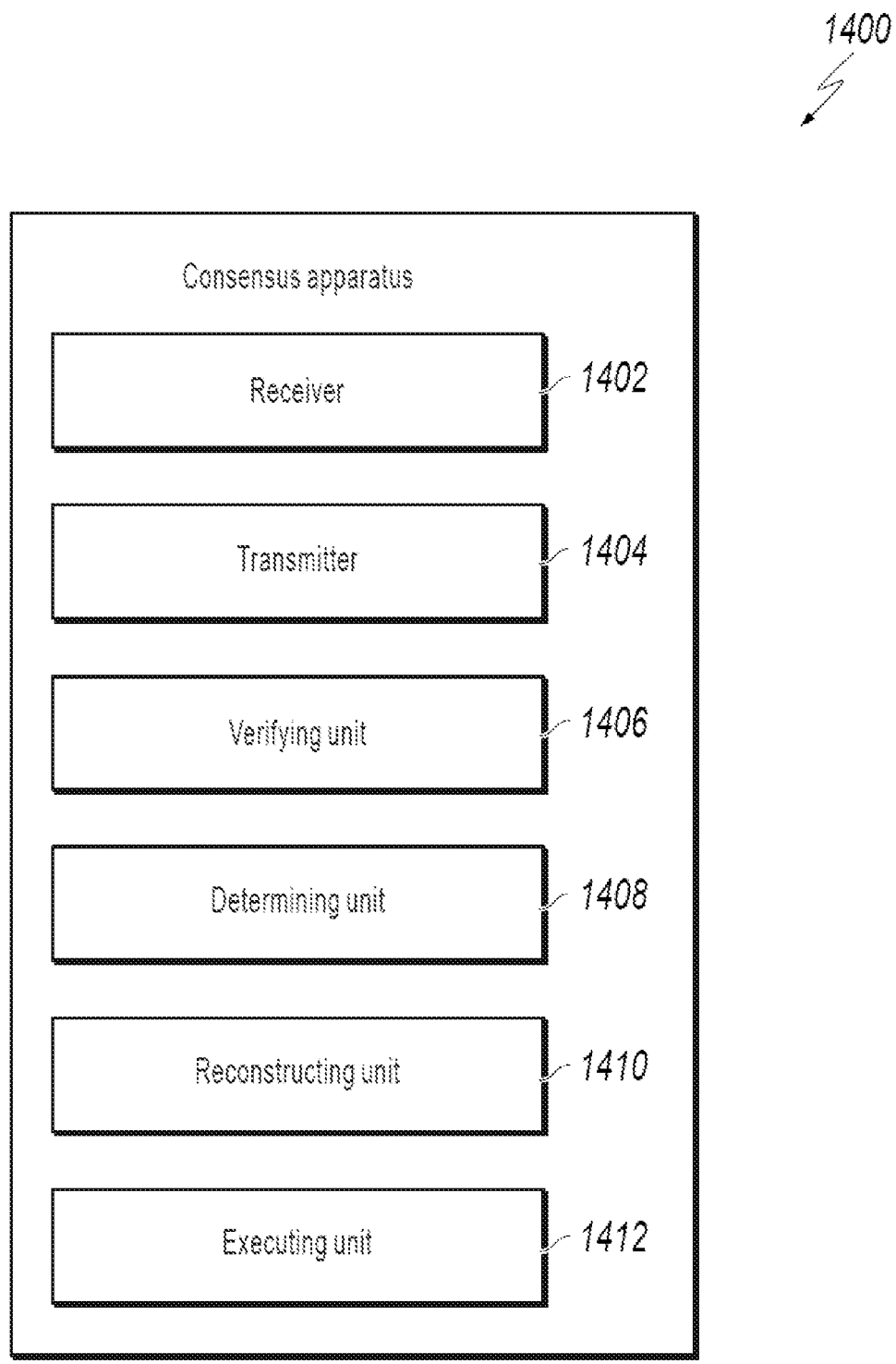
FIG. 14 depicts an example of a diagram illustrating modules of a consensus apparatus, according to an implementation of the present specification.

Referring to FIG. 14, FIG. 14 is a diagram illustrating modules of a consensus apparatus 1400, according to an implementation of the present specification. The apparatus 1400 for achieving consensus can be applied to a consensus system based on a blockchain technology. The apparatus 1400 can correspond to the implementations shown in FIGS. 1-6. For example, the apparatus 1400 can be implemented in a backup node of a blockchain network. The apparatus 1400 includes the following: a receiver or receiving unit 1402, configured to receive a first message from the primary node, wherein the first message includes a composite hash value associated with a number of EC blocks, wherein the number of EC blocks are generated by the primary node according to an EC code using a transaction request; a transmitter or transmitting unit 1404, configured to send, by the backup node, a second message to the other network nodes in response to receiving the first message, wherein the second message includes the first message and a signature of the backup node associated with the first message; the receiver or receiving unit 1402, further configured to receive at least one second message from at least one backup node other than the backup node; a verifying unit 1406, configured to verify whether the at least one second message is valid in response to receiving the at least one second message from the at least one backup node; a determining unit 1408, configured to determine whether a number of valid second messages exceeds a pre-determined threshold; a reconstructing unit 1410, configured to reconstruct the transaction request based on a subset of the number of valid second messages according to the EC code in response to determining that the number of valid second messages exceeds the pre-determined threshold; the transmitter or transmitting unit 1404, configured to send a third message to the other network nodes in response to determining that the transaction request has been successfully reconstructed, wherein the third message includes a set of signatures that are in the valid second messages; the receiver or receiving unit 1402, further configured to receive at least one third message from at least one of the backup nodes; and an executing unit 1412, configured to execute the transaction request in response to receiving a pre-determined number of third messages that are identical.

In an optional implementation, the generating the plurality of EC blocks according to an EC code includes the following: transforming the transaction request into an EC message using the EC code; and dividing the EC message into the number of EC block.

In an optional implementation, the composite hash value of the plurality of EC block is generated using a hash tree.

In an optional implementation, the hash tree includes a Merkle tree, and the composite hash value is a root hash value of the Merkle tree.

In an optional implementation, the signature of the backup node associated with the first message includes a private key signature of the backup node associated with the first message.

In an optional implementation, the at least one second message further includes at least one of the number of EC blocks.

In an optional implementation, the verifying whether the at least one second message is valid includes the following: generating a reconstructed hash tree using the at least one of the number of EC blocks in the at least one second message; determining a reconstructed composite hash value of the reconstructed hash tree; comparing the reconstructed composite hash value to a composite hash value in the at least one second message; and determining whether the reconstructed composite hash value matches the composite hash values in the at least one second message.

In an optional implementation, the determining unit 1408 is further configured to determine that the at least one second message is valid in response to determining that the reconstructed composite hash value matches the composite hash values in the second messages.

In an optional implementation, the pre-determined number of third messages that are identical include the pre-determined number of the third messages having an identical set of signatures.

FIG. 14 is a schematic diagram illustrating an internal functional module and a structure of a consensus apparatus 1400. An execution body in essence can be an electronic device, and the electronic device includes the following: at least one processor; and a memory configured to store an executable instruction of the at least one processor.

The at least one processor is configured to receive a first message from the primary node, wherein the first message includes a composite hash value associated with a number of EC blocks, wherein the number of EC blocks are generated by the primary node according to an EC code using a transaction request; send, by the backup node, a second message to the other network nodes in response to receiving the first message, wherein the second message includes the first message and a signature of the backup node associated with the first message; receive at least one second message from at least one backup node other than the backup node; verify whether the at least one second message is valid in response to receiving the at least one second message from the at least one backup node; determine whether a number of valid second messages exceeds a pre-determined threshold; reconstruct the transaction request based on a subset of the number of valid second messages according to the EC code in response to determining that the number of valid second messages exceeds the pre-determined threshold; send a third message to the other network nodes in response to determining that the transaction request has been successfully reconstructed, wherein the third message includes a set of signatures that are in the valid second messages; receive at least one third message from at least one of the backup nodes; and execute the transaction request in response to receiving a pre-determined number of third messages that are identical.

Optionally, the generating the plurality of EC blocks according to an EC code includes the following: transforming the transaction request into an EC message using the EC code; and dividing the EC message into the number of EC block.

Optionally, the composite hash value of the plurality of EC block is generated using a hash tree.

Optionally, the hash tree includes a Merkle tree, and the composite hash value is a root hash value of the Merkle tree.

Optionally, the signature of the backup node associated with the first message includes a private key signature of the backup node associated with the first message.

Optionally, the at least one second message further includes at least one of the number of EC blocks.

Optionally, the verifying whether the at least one second message is valid includes the following: generating a reconstructed hash tree using the at least one of the number of EC blocks in the at least one second message; determining a reconstructed composite hash value of the reconstructed hash tree; comparing the reconstructed composite hash value to a composite hash value in the at least one second message; and determining whether the reconstructed composite hash value matches the composite hash values in the at least one second message.

Optionally, the at least one processor is further configured to determine that the at least one second message is valid in response to determining that the reconstructed composite hash value matches the composite hash values in the second messages.

Optionally, the pre-determined number of third messages that are identical include the pre-determined number of the third messages having an identical set of signatures.

Figure 15:
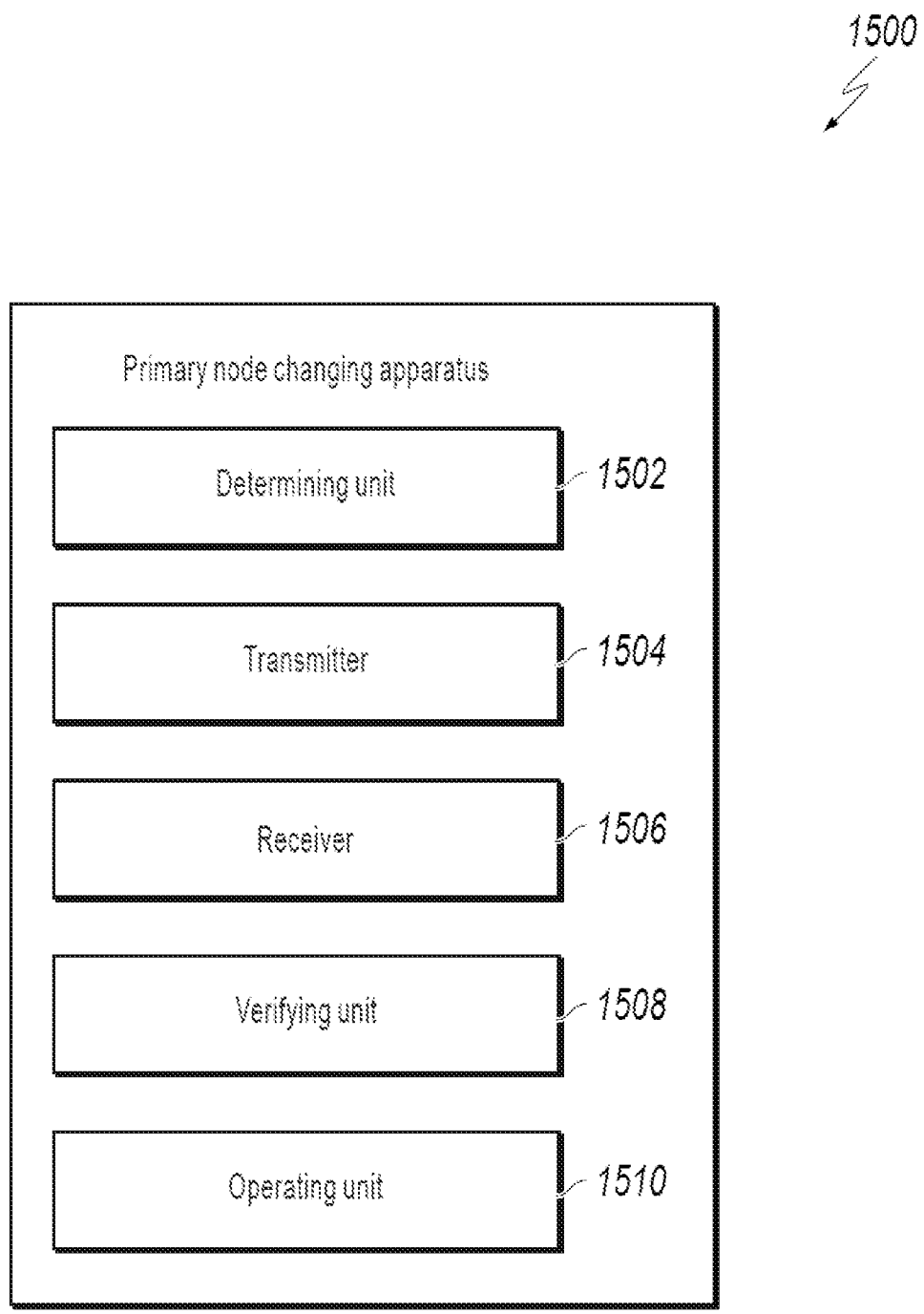
FIG. 15 depicts an example of a diagram illustrating modules of a primary node changing apparatus, according to an implementation of the present specification.

Referring to FIG. 15, FIG. 15 is a diagram illustrating modules of a primary node changing apparatus 1500, according to an implementation of the present specification. The apparatus 1500 for changing a primary node can be applied to a consensus system based on a blockchain technology. The apparatus 1500 can correspond to the implementations shown in FIGS. 7-9. For example, the apparatus 1500 can be implemented in a backup node of a blockchain network. The apparatus 1500 includes the following: a determining unit 1502, configured to determine that an epoch change needs to be performed, wherein the epoch change causes a change from a current epoch with a current primary node to a new epoch with a new primary node, wherein the current epoch comprises a consensus process for achieving consensus among the number of network nodes using the primary node, the consensus process including three phases; the determining unit 1502, further configured to determine a respective weight of the backup node associated with each of the three phases of the consensus process in the current epoch, wherein the weight is a metric of a qualification of the backup node to be the new primary node; the determining unit 1502, further configured to determine a weight sum for the backup node based on the respective weight of the backup node associated with each of the three phases in the current epoch; a transmitter or transmitting unit 1504, configured to send an EPOCH_CHANGE message to the number of network nodes other than the network node in response to determining that the weight sum reaches a first predetermined threshold, wherein the EPOCH_CHANGE message indicates a request for a change from the current epoch with the current primary node to the new epoch with the backup node being the new primary node, and the EPOCH_CHANGE message includes the weight sum of the backup node; a receiver or receiving unit 1506, configured to receive at least one NEW_EPOCH message from at least one of the number of network nodes other than the backup node, wherein the NEW_EPOCH message indicates an acknowledgement of the backup node to be the new primary node; a verifying unit 1508, configured to verify whether the at least one NEW_EPOCH message is valid; the determining unit 1502, further configured to determine whether a number of valid NEW_EPOCH messages out of the at least one NEW_EPOCH message exceeds a second predetermined threshold; and the determining unit 1502, further configured to determine the backup node to be the new primary node in the new epoch in response to determining that the number of valid NEW_EPOCH messages exceeds the second predetermined threshold.

In an optional implementation, the determining a respective weight of the backup node associated with each of the three phases of the consensus process in the current epoch includes determining a weight of the backup node for a first phase of the consensus process to be a first value.

In an optional implementation, the determining a respective weight of the backup node associated with each of the three phases of the consensus process in the current epoch includes the following: in response to determining a failure of a quorum verification in a second phase of the consensus process in the current epoch, determining a weight of the backup node for the second phase of the consensus process to be a first value; and in response to determining a success of a quorum verification in the second phase of the consensus process in the current epoch, determining the weight of the backup node for the second phase of the consensus process to be a second value, wherein the first value is smaller than the second value.

In an optional implementation, the quorum verification in the second phase for the network node includes receiving a predetermined number of ECHO messages from other network nodes.

In an optional implementation, the determining a respective weight of the backup node associated with each of the three phases of the consensus process in the current epoch includes the following: in response to determining a failure of a quorum verification in a third phase of the consensus process in the current epoch, determining a weight of the backup node for the third phase of the consensus process to be a third value; and in response to determining a success of a quorum verification in the third phase of the consensus process in the current epoch, determining the weight of the backup node for the third phase of the consensus process to be a fourth value, wherein the third value is smaller than the fourth value.

In an optional implementation, the quorum verification in the third phase for the network node includes receiving a pre-determined number of accept messages from other network nodes, wherein each of the accept messages from other network nodes indicates each of the other network nodes has accepted a predetermined number of ECHO messages.

In an optional implementation, the EPOCH_CHANGE message further includes a set of signatures associated with a set of network nodes out of the number of network nodes, and wherein the NEW_EPOCH message comprises a digest of the EPOCH_CHANGE message.

In an optional implementation, the verifying whether the at least one valid NEW_EPOCH message is valid includes verifying whether the digest of the EPOCH_CHANGE message in the at least one NEW_EPOCH message is valid, and the verifying whether the digest of the EPOCH_CHANGE message in the at least one NEW_EPOCH message is valid includes verifying whether the set of signatures in the EPOCH_CHANGE message are valid.

In an optional implementation, the determining that an epoch change needs to be performed includes determining that an epoch change needs to be performed in response to determining that the consensus has not been achieved in the old epoch within a predetermined time period.

In an optional implementation, the primary node changing apparatus 1500 further includes the following: an operating unit 1510, configured to operate in the new epoch with the new primary node, wherein the new epoch comprises a consensus process for achieving consensus among the plurality of network nodes using the new primary node.

FIG. 15 is a schematic diagram illustrating an internal functional module and a structure of a primary node changing apparatus 1500. An execution body in essence can be an electronic device, and the electronic device includes the following: at least one processor; and a memory configured to store an executable instruction of the at least one processor.

The at least one processor is configured to determine that an epoch change needs to be performed, wherein the epoch change causes a change from a current epoch with a current primary node to a new epoch with a new primary node, wherein the current epoch comprises a consensus process for achieving consensus among the number of network nodes using the primary node, the consensus process including three phases; determine a respective weight of the backup node associated with each of the three phases of the consensus process in the current epoch, wherein the weight is a metric of a qualification of the backup node to be the new primary node; determine a weight sum for the backup node based on the respective weight of the backup node associated with each of the three phases in the current epoch; send an EPOCH_CHANGE message to the number of network nodes other than the network node in response to determining that the weight sum reaches a first predetermined threshold, wherein the EPOCH_CHANGE message indicates a request for a change from the current epoch with the current primary node to the new epoch with the backup node being the new primary node, and the EPOCH_CHANGE message includes the weight sum of the backup node; receive at least one NEW_EPOCH message from at least one of the number of network nodes other than the backup node, wherein the NEW_EPOCH message indicates an acknowledgement of the backup node to be the new primary node; verify whether the at least one NEW_EPOCH message is valid; determine whether a number of valid NEW_EPOCH messages out of the at least one NEW_EPOCH message exceeds a second predetermined threshold; and determine the backup node to be the new primary node in the new epoch in response to determining that the number of valid NEW_EPOCH messages exceeds the second predetermined threshold.

Optionally, the determining a respective weight of the backup node associated with each of the three phases of the consensus process in the current epoch includes determining a weight of the backup node for a first phase of the consensus process to be a first value.

Optionally, the determining a respective weight of the backup node associated with each of the three phases of the consensus process in the current epoch includes the following: in response to determining a failure of a quorum verification in a second phase of the consensus process in the current epoch, determining a weight of the backup node for the second phase of the consensus process to be a first value; and in response to determining a success of a quorum verification in the second phase of the consensus process in the current epoch, determining the weight of the backup node for the second phase of the consensus process to be a second value, wherein the first value is smaller than the second value.

Optionally, the quorum verification in the second phase for the network node includes receiving a predetermined number of ECHO messages from other network nodes.

Optionally, the determining a respective weight of the backup node associated with each of the three phases of the consensus process in the current epoch includes the following: in response to determining a failure of a quorum verification in a third phase of the consensus process in the current epoch, determining a weight of the backup node for the third phase of the consensus process to be a third value; and in response to determining a success of a quorum verification in the third phase of the consensus process in the current epoch, determining the weight of the backup node for the third phase of the consensus process to be a fourth value, wherein the third value is smaller than the fourth value.

Optionally, the quorum verification in the third phase for the network node includes receiving a pre-determined number of accept messages from other network nodes, wherein each of the accept messages from other network nodes indicates each of the other network nodes has accepted a predetermined number of ECHO messages.

Optionally, the EPOCH_CHANGE message further includes a set of signatures associated with a set of network nodes out of the number of network nodes, and wherein the NEW_EPOCH message comprises a digest of the EPOCH_CHANGE message.

Optionally, the verifying whether the at least one valid NEW_EPOCH message is valid includes verifying whether the digest of the EPOCH_CHANGE message in the at least one NEW_EPOCH message is valid, and the verifying whether the digest of the EPOCH_CHANGE message in the at least one NEW_EPOCH message is valid includes verifying whether the set of signatures in the EPOCH_CHANGE message are valid.

Optionally, the determining that an epoch change needs to be performed includes determining that an epoch change needs to be performed in response to determining that the consensus has not been achieved in the old epoch within a predetermined time period.

Optionally, the at least one processor is further configured to operate in the new epoch with the new primary node, wherein the new epoch comprises a consensus process for achieving consensus among the plurality of network nodes using the new primary node.

Figure 16:
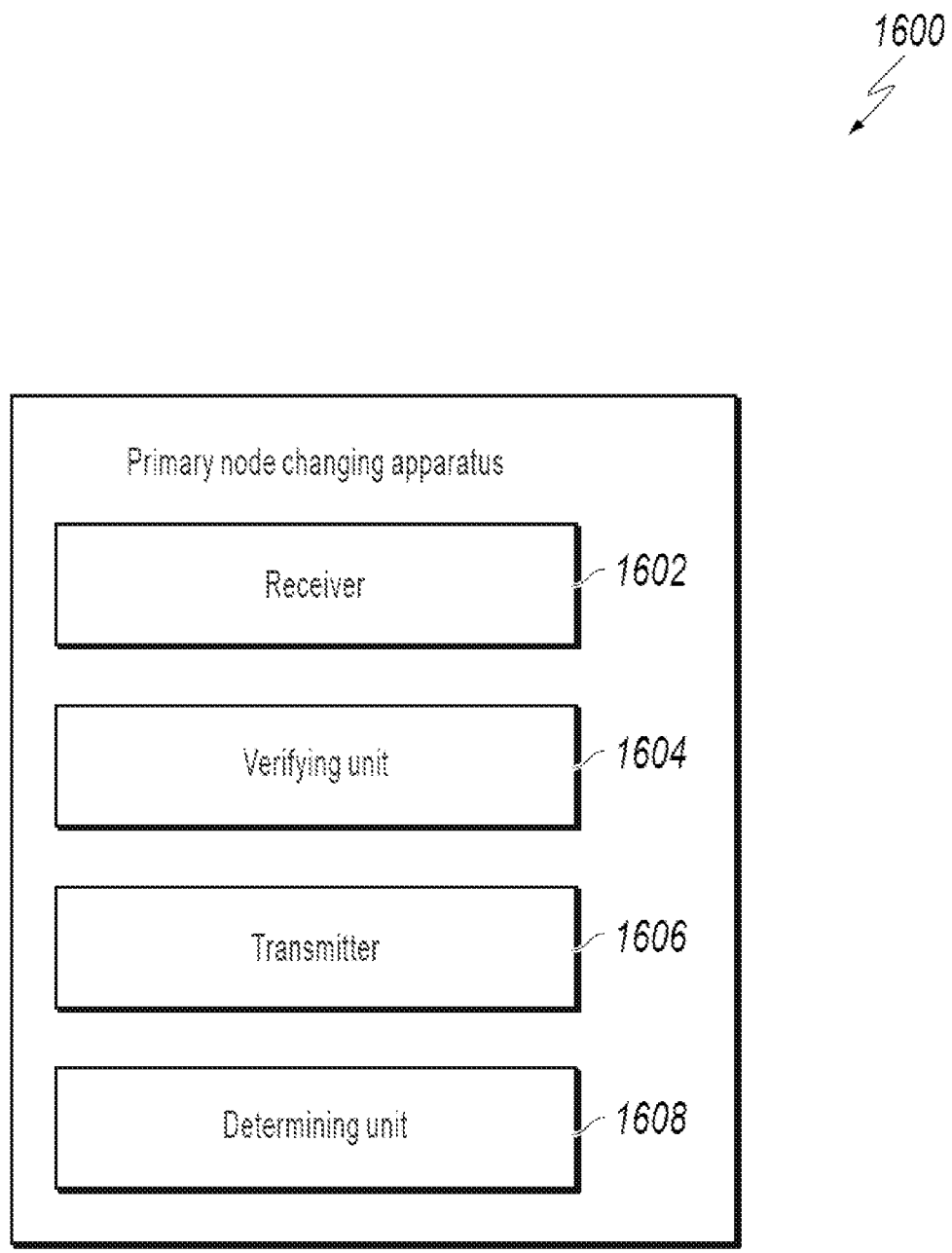
FIG. 16 depicts an example of a diagram illustrating modules of a primary node changing apparatus, according to an implementation of the present specification.

Referring to FIG. 16, FIG. 16 is a diagram illustrating modules of a primary node changing apparatus 1600, according to an implementation of the present specification. The apparatus 1600 for changing a primary node can be applied to a consensus system based on a blockchain technology. The apparatus 1600 corresponds to the implementations shown in FIGS. 7-9. For example, the apparatus 1400 can be implemented in a network node of a blockchain network. The apparatus 1600 includes the following: a receiver or receiving unit 1602, configured to receive an EPCOH_CHANGE message from a backup node other than the network node, wherein the EPOCH_CHANGE message includes an indication that an epoch change needs to be performed, wherein the epoch change causes an change from a current epoch with a current primary node to a new epoch with a new primary node; a verifying unit 1604, configured to verify whether the EPOCH_CHANGE message is valid; a transmitter or transmitting unit 1606, configured to send a NEW_EPOCH message to the other network nodes in response to verifying that the EPOCH_CHANGE message is valid, wherein the NEW_EPOCH message comprises a digest of the EPOCH_CHANGE message; the receiver or receiving unit 1602, further configured to receive at least one NEW_EPOCH message from at least one of the number of network nodes other than the network node; the verifying unit 1604, further configured to verify whether the at least one NEW_EPOCH message is valid; a determining unit 1608, configured to determine whether a number of valid NEW_EPOCH messages out of the at least one NEW_EPOCH message exceeds a predetermined threshold; and the determining unit 1608, further configured to determine the backup node to be the new primary node in the new epoch in response to determining that the number of valid NEW_EPOCH messages exceeds the predetermined threshold.

In an optional implementation, the EPOCH_CHANGE message includes a weight sum associated with the backup node and a set of signatures associated with a set of network nodes out of the number of network nodes.

In an optional implementation, the verifying whether the EPOCH_CHANGE message is valid includes verifying whether the weight sum in the EPOCH_CHANGE message is valid, and the verifying whether the weight sum in the EPOCH_CHANGE message is valid includes verifying whether the set of signatures are valid.

In an optional implementation, the verifying whether the at least one NEW_EPOCH message is valid includes verifying whether the digest of the EPOCH_CHANGE message in the at least one NEW_EPOCH message is valid, and the verifying whether the digest of the EPOCH_CHANGE message in the at least one NEW_EPOCH message is valid includes verifying whether the set of signatures in the EPOCH_CHANGE message are valid.

FIG. 16 is a schematic diagram illustrating an internal functional module and a structure of a primary node changing apparatus 1600. An execution body in essence can be an electronic device, and the electronic device includes the following: a at least one processor; and a memory configured to store an executable instruction of the at least one processor.

The at least one processor is configured to receive an EPCOH_CHANGE message from a backup node other than the network node, wherein the EPOCH_CHANGE message includes an indication that an epoch change needs to be performed, wherein the epoch change causes an change from a current epoch with a current primary node to a new epoch with a new primary node; verify whether the EPOCH_CHANGE message is valid; send a NEW_EPOCH message to the other network nodes in response to verifying that the EPOCH_CHANGE message is valid, wherein the NEW_EPOCH message comprises a digest of the EPOCH_CHANGE message; receive at least one NEW_EPOCH message from at least one of the number of network nodes other than the network node; verify whether the at least one NEW_EPOCH message is valid; determine whether a number of valid NEW_EPOCH messages out of the at least one NEW_EPOCH message exceeds a predetermined threshold; and determine the backup node to be the new primary node in the new epoch in response to determining that the number of valid NEW_EPOCH messages exceeds the predetermined threshold.

Optionally, the EPOCH_CHANGE message includes a weight sum associated with the backup node and a set of signatures associated with a set of network nodes out of the number of network nodes.

Optionally, the verifying whether the EPOCH_CHANGE message is valid includes verifying whether the weight sum in the EPOCH_CHANGE message is valid, and the verifying whether the weight sum in the EPOCH_CHANGE message is valid includes verifying whether the set of signatures are valid.

Optionally, the verifying whether the at least one NEW_EPOCH message is valid includes verifying whether the digest of the EPOCH_CHANGE message in the at least one NEW_EPOCH message is valid, and the verifying whether the digest of the EPOCH_CHANGE message in the at least one NEW_EPOCH message is valid includes verifying whether the set of signatures in the EPOCH_CHANGE message are valid.

Figure 17:
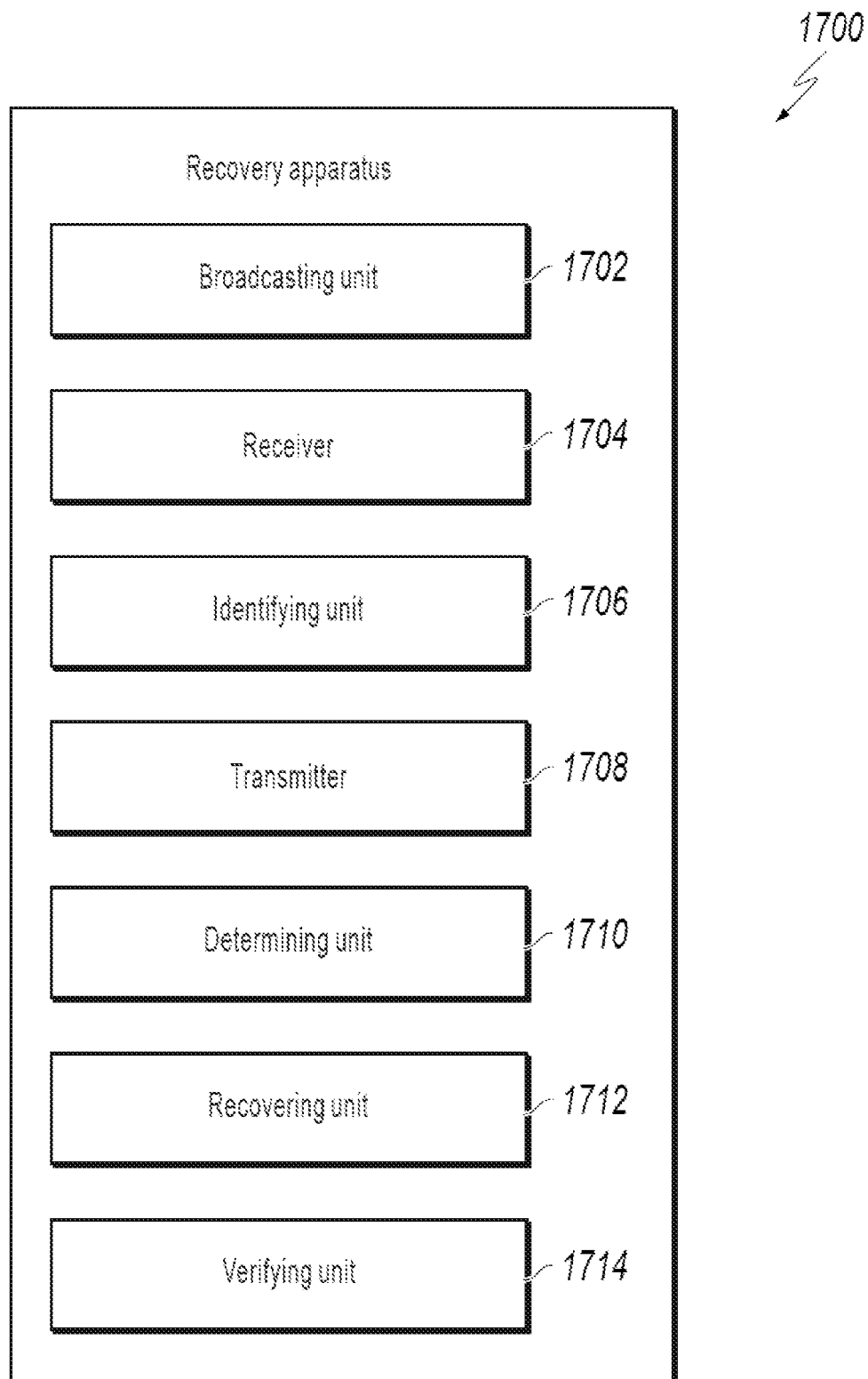
FIG. 17 depicts an example of a diagram illustrating modules of a recovery apparatus, according to an implementation of the present specification.

Referring to FIG. 17, FIG. 17 is a diagram illustrating modules of a recovery apparatus 1700, according to an implementation of the present specification. The apparatus 1700 for recovery can be applied to a consensus system based on a blockchain technology. The apparatus 1700 can correspond to the implementations shown in FIGS. 10-12. For example, the apparatus 1700 can be implemented in a network node of a blockchain network. The apparatus 1700 includes the following: a broadcasting unit 1702, configured to broadcast, by a network node of a blockchain network, a state request message to a number of other network nodes of the blockchain network, wherein the network node is to recover a target transaction of a target sequence number; a receiver 1704 or a receiving unit 1704, configured to receive a number of state reply messages from the number of other network nodes, wherein each of the number of state reply messages includes a sequence number; an identifying unit 1706, configured to identify the target sequence number based on the same sequence number in response to determining that a number of state reply messages exceeds a pre-determined threshold, wherein each of the number of the state reply messages comprises a same sequence number; a transmitter 1708 or a transmitting unit 1708, configured to send a requesting message to the number of other network nodes, wherein the requesting message requests an ECHO message from each of the number of other network nodes, wherein the ECHO message is a message transmitted by the each of the number of other network nodes for achieving a consensus among the number of other network nodes on the target transaction having the target sequence number, and the ECHO message includes a part of the target transaction and a signature of the each of the number of other network nodes; the receiver 1704 or the receiving unit 1704, further configured to receive a number of ECHO messages from the number of other network nodes; a determining unit 1710, configured to determine a number of valid ECHO messages out of the number of ECHO messages, wherein each of the number of valid ECHO messages includes the target sequence number; a recovering unit 1712, configured to recover the target transaction having the target sequence number at the network node based on the number of valid ECHO messages in response to determining that the number of valid ECHO messages exceeds a pre-determined threshold; and the transmitter 1708, further configured to send a message to the number of other network nodes indicating the network node has been recovered.

In an optional implementation, the number of network nodes includes a primary node and one or more backup nodes.

In an optional implementation, the network node is a primary node or a backup node.

In an optional implementation, the requesting message includes the target sequence number.

In an optional implementation, the recovery apparatus 1700 further includes the following: a verifying unit 1714, configured to verify, by each of the number of other network nodes other than the network node, the requesting message before sending the ECHO messages to the network node.

In an optional implementation, the verifying unit 1714, is further configured to verify whether each of the ECHO messages is valid, wherein the verifying whether each of the ECHO messages is valid includes verifying whether each of the ECHO messages is valid using a Merkel tree.

In an optional implementation, the verifying whether each of the ECHO message is valid further includes verifying whether the signature in the ECHO message is valid.

In an optional implementation, each of the ECHO messages further includes at least one of a number of erasure code (EC) blocks associated with the target transaction, wherein the number of EC blocks are generated according to an EC code using the target transaction.

In an optional implementation, the recovering the target transaction having the target sequence number at the network node based on the number of valid ECHO messages comprises reconstructing the target transaction using a subset of the plurality of EC blocks that are in the number of valid ECHO messages.

In an optional implementation, the message to the number of other network nodes indicating the network node has been recovered include a set of signatures in the number of valid ECHO messages and the target sequence number.

The system, apparatus, module, or unit illustrated in the previous implementations can be implemented by using a computer chip or an entity, or can be implemented by using a product having a certain function. A typical implementation device is a computer, and the computer can be a personal computer, a laptop computer, a cellular phone, a camera phone, a smartphone, a personal digital assistant, a media player, a navigation device, an email receiving and sending device, a game console, a tablet computer, a wearable device, or any combination of these devices.

For an implementation process of functions and roles of each unit in the apparatus, references can be made to an implementation process of corresponding steps in the previous method. Details are omitted here for simplicity.

Because an apparatus implementation basically corresponds to a method implementation, for related parts, references can be made to related descriptions in the method implementation. The previously described apparatus implementation is merely an example. The units described as separate parts may or may not be physically separate, and parts displayed as units may or may not be physical units, may be located in one position, or may be distributed on a plurality of network units. Some or all of the modules can be selected based on actual demands to achieve the objectives of the solutions of the present specification. A person of ordinary skill in the art can understand and implement the implementations of the present application without creative efforts.

FIG. 17 is a schematic diagram illustrating an internal functional module and a structure of a recovery apparatus 1700. An execution body in essence can be an electronic device, and the electronic device includes the following: at least one processor; and a memory configured to store an executable instruction of the at least one processor.

The at least one processor is configured to broadcast, by a network node of a blockchain network, a state request message to a number of other network nodes of the blockchain network, wherein the network node is to recover a target transaction of a target sequence number; receive a number of state reply messages from the number of other network nodes, wherein each of the number of state reply messages includes a sequence number; identify the target sequence number based on the same sequence number in response to determining that a number of state reply messages exceeds a pre-determined threshold, wherein each of the number of the state reply messages comprises a same sequence number; send a requesting message to the number of other network nodes, wherein the requesting message requests an ECHO message from each of the number of other network nodes, wherein the ECHO message is a message transmitted by the each of the number of other network nodes for achieving a consensus among the number of other network nodes on the target transaction having the target sequence number, and the ECHO message includes a part of the target transaction and a signature of the each of the number of other network nodes; receive a number of ECHO messages from the plurality of other network nodes; determine a number of valid ECHO messages out of the number of ECHO messages, wherein each of the number of valid ECHO messages includes the target sequence number; recover the target transaction having the target sequence number at the network node based on the number of valid ECHO messages in response to determining that the number of valid ECHO messages exceeds a pre-determined threshold; and send a message to the number of other network nodes indicating the network node has been recovered.

Optionally, the number of network nodes include a primary node and one or more backup nodes.

Optionally, the network node is a primary node or a backup node.

Optionally, the requesting message includes the target sequence number.

Optionally, the at least one processor is further configured to verify, by each of the number of other network nodes other than the network node, the requesting message before sending the ECHO messages to the network node.

Optionally, the at least one processor is further configured to verify whether each of the ECHO messages is valid, wherein the verifying whether each of the ECHO messages is valid includes verifying whether each of the ECHO messages is valid using a Merkel tree.

Optionally, the verifying whether each of the ECHO message is valid further includes verifying whether the signature in the ECHO message is valid.

Optionally, each of the ECHO messages further includes at least one of a number of erasure code (EC) blocks associated with the target transaction, wherein the number of EC blocks are generated according to an EC code using the target transaction.

Optionally, recovering the target transaction having the target sequence number at the network node based on the number of valid ECHO messages includes reconstructing the target transaction using a subset of the number of EC blocks that are in the number of valid ECHO messages.

Optionally, the message to the number of other network nodes indicating the network node has been recovered includes a set of signatures in the number of valid ECHO messages and the target sequence number.

Implementations of the subject matter and the actions and operations described in this specification can be implemented in digital electronic circuitry, in tangibly-embodied computer software or firmware, in computer hardware, including the structures disclosed in this specification and their structural equivalents, or in combinations of one or more of them. Implementations of the subject matter described in this specification can be implemented as one or more computer programs, e.g., one or more modules of computer program instructions, encoded on a computer program carrier, for execution by, or to control the operation of, data processing apparatus. The carrier may be a tangible non-transitory computer storage medium. Alternatively, or in addition, the carrier may be an artificially-generated propagated signal, e.g., a machine-generated electrical, optical, or electromagnetic signal that is generated to encode information for transmission to suitable receiver apparatus for execution by a data processing apparatus. The computer storage medium can be or be part of a machine-readable storage device, a machine-readable storage substrate, a random or serial access memory device, or a combination of one or more of them. A computer storage medium is not a propagated signal.

The term "data processing apparatus" encompasses all kinds of apparatus, devices, and machines for processing data, including by way of example a programmable processor, a computer, or multiple processors or computers. Data processing apparatus can include special-purpose logic circuitry, e.g., an FPGA (field programmable gate array), an ASIC (application-specific integrated circuit), or a GPU (graphics processing unit). The apparatus can also include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, an engine, a script, or code, can be written in any form of programming language, including compiled or interpreted languages, or declarative or procedural languages; and it can be deployed in any form, including as a stand-alone program or as a module, component, engine, subroutine, or other unit suitable for executing in a computing environment, which environment may include one or more computers interconnected by a data communication network in one or more locations.

A computer program may, but need not, correspond to a file in a file system. A computer program can be stored in a portion of a file that holds other programs or data, e.g., one or more scripts stored in a markup language document, in a single file dedicated to the program in question, or in multiple coordinated files, e.g., files that store one or more modules, sub-programs, or portions of code.

The processes and logic flows described in this specification can be performed by one or more computers executing one or more computer programs to perform operations by operating on input data and generating output. The processes and logic flows can also be performed by special-purpose logic circuitry, e.g., an FPGA, an ASIC, or a GPU, or by a combination of special-purpose logic circuitry and one or more programmed computers.

Computers suitable for the execution of a computer program can be based on general or special-purpose microprocessors or both, or any other kind of central processing unit. Generally, a central processing unit will receive instructions and data from a read-only memory or a random access memory or both. Elements of a computer can include a central processing unit for executing instructions and one or more memory devices for storing instructions and data. The central processing unit and the memory can be supplemented by, or incorporated in, special-purpose logic circuitry.

Generally, a computer will be coupled to at least one non-transitory computer-readable storage medium (also referred to as a computer-readable memory). The storage medium coupled to the computer can be an internal component of the computer (e.g., an integrated hard drive) or an external component (e.g., universal serial bus (USB) hard drive or a storage system accessed over a network). Examples of storage media can include, for example, magnetic, magneto-optical, or optical disks, solid state drives, network storage resources such as cloud storage systems, or other types of storage media. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

To provide for interaction with a user, implementations of the subject matter described in this specification can be implemented on, or configured to communicate with, a computer having a display device, e.g., a LCD (liquid crystal display) monitor, for displaying information to the user, and an input device by which the user can provide input to the computer, e.g., a keyboard and a pointing device, e.g., a mouse, a trackball or touchpad. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser, or by interacting with an app running on a user device, e.g., a smartphone or electronic tablet. Also, a computer can interact with a user by sending text messages or other forms of message to a personal device, e.g., a smartphone that is running a messaging application, and receiving responsive messages from the user in return.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions. For special-purpose logic circuitry to be configured to perform particular operations or actions means that the circuitry has electronic logic that performs the operations or actions.

While this specification contains many specific implementation details, these should not be construed as limitations on the scope of what is being claimed, which is defined by the claims themselves, but rather as descriptions of features that may be specific to particular implementations. Certain features that are described in this specification in the context of separate implementations can also be realized in combination in a single implementation. Conversely, various features that are described in the context of a single implementations can also be realized in multiple implementations separately or in any suitable subcombination. Moreover, although features may be described above as acting in certain combinations and even initially be claimed as such, one or more features from a claimed combination can in some cases be excised from the combination, and the claim may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method for performing a recovery process of a network node of a blockchain network, the method comprising:

broadcasting, by a network node of a blockchain network, a state request message to a plurality of other network nodes of the blockchain network, wherein the network node is to recover a target transaction of a target sequence number;

receiving, by the network node, a plurality of state reply messages from the plurality of other network nodes, wherein each of the plurality of state reply messages comprises a sequence number;

in response to determining that a number of state reply messages exceeds a pre-determined threshold, wherein each of the number of the state messages comprises a same sequence number, identifying, by the network node, the target sequence number based on the same sequence number;

sending, by the network node, a requesting message to the plurality of other network nodes, wherein the requesting message requests an ECHO message from each of the plurality of other network nodes, wherein the ECHO message is a message transmitted by the each of the plurality of other network nodes for achieving a consensus among the plurality of other network nodes on the target transaction having the target sequence number, and the ECHO message comprises a part of the target transaction and a signature of the each of the plurality of other network nodes;

receiving, by the network node, a plurality of ECHO messages from the plurality of other network nodes, wherein each ECHO message comprises at least one of a plurality of erasure code (EC) blocks associated with the target transaction, wherein the plurality of EC blocks are generated according to an EC code using the target transaction;

determining, by the network node, a number of valid ECHO messages out of the plurality of ECHO messages, wherein each of the number of valid ECHO messages comprises the target sequence number;

in response to determining that the number of valid ECHO messages exceeds a pre-determined threshold, recovering, by the network node, the target transaction having the same sequence number at the network node based on the number of valid ECHO messages, wherein recovering the target transaction comprises reconstructing, according to the EC code, the target transaction using at least a subset of the plurality of EC blocks that are in the number of valid ECHO messages; and sending, by the network node, a message to the plurality of other network nodes indicating the network node has been recovered.

2. The method of claim 1, wherein the plurality of network nodes comprises a primary node and one or more backup nodes.

3. The method of claim 1, wherein the network node is a primary node or a backup node.

4. The method of claim 1, wherein the requesting message comprises the target sequence number.

5. The method of claim 4, wherein the method further comprises:

verifying, by each of the plurality of other network nodes other than the network node, the requesting message before sending the ECHO messages to the network node.

6. The method of claim 1, wherein the method further comprises:

verifying, by the network node, whether each of the ECHO messages is valid, wherein the verifying whether each of the ECHO messages is valid comprises verifying whether each of the ECHO messages is valid using a Merkel tree.

7. The method of claim 6, wherein the verifying whether each of the ECHO message is valid further comprises verifying whether the signature in the ECHO message is valid.

8. The method of claim 1, wherein the plurality of EC blocks are generated according to an EC code using the target transaction comprises that the plurality of EC blocks are generated by transforming the target transaction into an EC message longer than the target transaction and dividing the EC message into the plurality of EC blocks according to the EC code.

9. The method of claim 1, wherein the message to the plurality of other network nodes indicating the network node has been recovered comprises a set of signatures in the number of valid ECHO messages and the target sequence number.

10. A non-transitory, computer-readable medium storing one or more instructions executable by a computer system to perform operations comprising:

broadcasting, by a network node of a blockchain network, a state request message to a plurality of other network nodes of the blockchain network, wherein the network node is to recover a target transaction of a target sequence number;

receiving, by the network node, a plurality of state reply messages from the plurality of other network nodes, wherein each of the plurality of state reply messages comprises a sequence number;

in response to determining that a number of state reply messages exceeds a pre-determined threshold, wherein each of the number of the state messages comprises a same sequence number, identifying, by the network node, the target sequence number based on the same sequence number;

sending, by the network node, a requesting message to the plurality of other network nodes, wherein the requesting message requests an ECHO message from each of the plurality of other network nodes, wherein the ECHO message is a message transmitted by the each of the plurality of other network nodes for achieving a consensus among the plurality of other network nodes on the target transaction having the target sequence number, and the ECHO message comprises a part of the target transaction and a signature of the each of the plurality of other network nodes;

receiving, by the network node, a plurality of ECHO messages from the plurality of other network nodes, wherein each ECHO message comprises at least one of a plurality of erasure code (EC) blocks associated with the target transaction, wherein the plurality of EC blocks are generated according to an EC code using the target transaction;

determining, by the network node, a number of valid ECHO messages out of the plurality of ECHO messages, wherein each of the number of valid ECHO messages comprises the target sequence number;

in response to determining that the number of valid ECHO messages exceeds a pre-determined threshold, recovering, by the network node, the target transaction having the same sequence number at the network node based on the number of valid ECHO messages, wherein recovering the target transaction comprises reconstructing, according to the EC code, the target transaction using at least a subset of the plurality of EC blocks that are in the number of valid ECHO messages; and sending, by the network node, a message to the plurality of other network nodes indicating the network node has been recovered.

11. The non-transitory, computer-readable medium of claim 10, wherein the plurality of network nodes comprises a primary node and one or more backup nodes.

12. The non-transitory, computer-readable medium of claim 10, wherein the network node is a primary node or a backup node.

13. The non-transitory, computer-readable medium of claim 10, wherein the requesting message comprises the target sequence number.

14. The non-transitory, computer-readable medium of claim 13, wherein the operations further comprise:

verifying, by each of the plurality of other network nodes other than the network node, the requesting message before sending the ECHO messages to the network node.

15. The non-transitory, computer-readable medium of claim 10, wherein the operations further comprise:

verifying, by the network node, whether each of the ECHO messages is valid, wherein the verifying whether each of the ECHO messages is valid comprises verifying whether each of the ECHO messages is valid using a Merkel tree.

16. The non-transitory, computer-readable medium of claim 15, wherein the verifying whether each of the ECHO message is valid further comprises verifying whether the signature in the ECHO message is valid.

17. The non-transitory, computer-readable medium of claim 10, wherein the plurality of EC blocks are generated according to an EC code using the target transaction comprises that the plurality of EC blocks are generated by transforming the target transaction into an EC message longer than the target transaction and dividing the EC message into the plurality of EC blocks according to the EC code.

18. The non-transitory, computer-readable medium of claim 10, wherein the message to the plurality of other network nodes indicating the network node has been recovered comprises a set of signatures in the number of valid ECHO messages and the target sequence number.

19. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
broadcasting, by a network node of a blockchain network, a state request message to a plurality of other network nodes of the blockchain network, wherein the network node is to recover a target transaction of a target sequence number;
receiving, by the network node, a plurality of state reply messages from the plurality of other network nodes, wherein each of the plurality of state reply messages comprises a sequence number;
in response to determining that a number of state reply messages exceeds a pre-determined threshold, wherein each of the number of the state messages comprises a same sequence number, identifying, by the network node, the target sequence number based on the same sequence number;
sending, by the network node, a requesting message to the plurality of other network nodes, wherein the requesting message requests an ECHO message from each of the plurality of other network nodes, wherein the ECHO message is a message transmitted by the each of the plurality of other network nodes for achieving a consensus among the plurality of other network nodes on the target transaction having the target sequence number, and the ECHO message comprises a part of the target transaction and a signature of the each of the plurality of other network nodes;
receiving, by the network node, a plurality of ECHO messages from the plurality of other network nodes, wherein each ECHO message comprises at least one of a plurality of erasure code (EC) blocks associated with the target transaction, wherein the plurality of EC blocks are generated according to an EC code using the target transaction;
determining, by the network node, a number of valid ECHO messages out of the plurality of ECHO messages, wherein each of the number of valid ECHO messages comprises the target sequence number;
in response to determining that the number of valid ECHO messages exceeds a pre-determined threshold, recovering, by the network node, the target transaction having the same sequence number at the network node based on the number of valid ECHO messages, wherein recovering the target transaction comprises reconstructing, according to the EC code, the target transaction using at least a subset of the plurality of EC blocks that are in the number of valid ECHO messages; and
sending, by the network node, a message to the plurality of other network nodes indicating the network node has been recovered.

20. The system of claim 19, wherein the plurality of network nodes comprises a primary node and one or more backup nodes.

21. The system of claim 19, wherein the network node is a primary node or a backup node.

22. The system of claim 19, wherein the requesting message comprises the target sequence number.

23. The system of claim 22, wherein the operations further comprise:
verifying, by each of the plurality of other network nodes other than the network node, the requesting message before sending the ECHO messages to the network node.

24. The system of claim 19, wherein the operations further comprise:
verifying, by the network node, whether each of the ECHO messages is valid, wherein the verifying whether each of the ECHO messages is valid comprises verifying whether each of the ECHO messages is valid using a Merkel tree.

25. The system of claim 24, wherein the verifying whether each of the ECHO message is valid further comprises verifying whether the signature in the ECHO message is valid.

26. The system of claim 19, wherein the plurality of EC blocks are generated according to an EC code using the target transaction comprises that the plurality of EC blocks are generated by transforming the target transaction into an EC message longer than the target transaction and dividing the EC message into the plurality of EC blocks according to the EC code.

27. The system of claim 19, wherein the message to the plurality of other network nodes indicating the network node has been recovered comprises a set of signatures in the number of valid ECHO messages and the target sequence number.

* * * * *